(12) United States Patent
Wang et al.

(10) Patent No.: US 12,477,487 B2
(45) Date of Patent: Nov. 18, 2025

(54) METHOD AND APPARATUS FOR TRIGGERING TRS ACTIVATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Shukun Wang, Dongguan (CN); Jing Xu, Dongguan (CN); Wenhong Chen, Dongguan (CN); Yanan Lin, Dongguan (CN); Bin Liang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 405 days.

(21) Appl. No.: 18/147,406

(22) Filed: Dec. 28, 2022

(65) Prior Publication Data
US 2023/0224833 A1 Jul. 13, 2023

Related U.S. Application Data

(63) Continuation of application No. PCT/CN2020/119467, filed on Sep. 30, 2020.

(51) Int. Cl.
*H04W 56/00* (2009.01)
*H04L 5/00* (2006.01)

(52) U.S. Cl.
CPC ......... *H04W 56/001* (2013.01); *H04L 5/0051* (2013.01)

(58) Field of Classification Search
CPC .......... H04L 5/0048; H04L 1/0027; H04L 1/0031; H04L 5/0098
See application file for complete search history.

(56) References Cited

U.S. PATENT DOCUMENTS

| | | | | |
|---|---|---|---|---|
| 2019/0141546 A1* | 5/2019 | Zhou | ........................ | H04L 5/001 |
| 2019/0215117 A1* | 7/2019 | Lee | ........................ | H04L 5/0094 |
| 2019/0260447 A1* | 8/2019 | Nam | .................. | H04W 72/0453 |
| 2019/0356444 A1* | 11/2019 | Noh | ........................ | H04W 72/23 |
| 2020/0413478 A1 | 12/2020 | Si et al. | | |
| 2021/0058215 A1 | 2/2021 | Si et al. | | |
| 2021/0329546 A1* | 10/2021 | Wang | .................... | H04L 5/0053 |

FOREIGN PATENT DOCUMENTS

| | | |
|---|---|---|
| CN | 107534533 A | 1/2018 |
| CN | 110149178 A | 8/2019 |

(Continued)

OTHER PUBLICATIONS

First Office Action of the Chinese application No. 202080105081.5, issued on Sep. 3, 2024. 18 pages with English translation.
ZTE, "Discussion on Supporting Efficient Activation/De-activation Mechanism for SCells in NR CA", 3GPP TSG RAN WG1 Meeting #102-e R1-2005442, e-Meeting, Aug. 17-28, 2020.

(Continued)

*Primary Examiner* — Yee F Lam
(74) *Attorney, Agent, or Firm* — PERKINS COIE LLP

(57) ABSTRACT

A method and apparatus for TRS activation, a terminal device, and a network device are provided. The method comprises: a terminal device receives a first activation instruction sent by a network device, the first activation instruction being used for activating a TRS, and the TRS being used for fast Scell activation; and the terminal device measures the TRS, the measured TRS being used for time-frequency synchronization with a Scell.

20 Claims, 7 Drawing Sheets

A network device transmits a first activation instruction to a terminal device, the terminal device receives the first activation instruction transmitted by the network device, and the first activation instruction is used for activating a TRS, and the TRS is used for fast activation of the Scell — 401

The network device transmits the TRS, and the terminal device measures the TRS, the measured TRS is used for time-frequency synchronization with a Scell — 402

(56) References Cited

FOREIGN PATENT DOCUMENTS

| CN | 110166192 | A | 8/2019 | | |
|---|---|---|---|---|---|
| CN | 110475364 | A | 11/2019 | | |
| CN | 111385078 | A | 7/2020 | | |
| CN | 111566974 | A | 8/2020 | | |
| WO | 2019191871 | A1 | 10/2019 | | |
| WO | 2020147596 | A1 | 7/2020 | | |
| WO | WO-2020135341 | A1 * | 7/2020 | ............ | H04L 5/001 |

OTHER PUBLICATIONS

International Search Report in the international application No. PCT/CN2020/119467, mailed on Jun. 25, 2021.
English translation of the Written Opinion of the International Search Authority in the international application No. PCT/CN2020/119467, mailed on Jun. 25, 2021.
Huawei, "New WID on further enhancements on Multi-Radio Dual-Connectivity", 3GPP TSG RAN Meeting #86 RP-193249, Sitges, Spain, Dec. 9-12, 2019.
Second Office Action of the Chinese application No. 202080105081. 5, issued on Dec. 9, 2024. 17 pages with English translation.
Nokia et al:"On low latency Scell activation",3GPP Draft R1-205908 3rd Generation Partnership Project (3GPP), Mobile Competence Centre ; 650, Route Des Lucioles ; F-06921 Sophia-Antipolis Cedex ; France, vol. RAN WG1, No. e-Meeting; Aug. 17, 2020-Aug. 28, 2020, Aug. 7, 2020(Aug. 7, 2020), XP052347282,the whole document, 4 pages.
Supplementary European Search Report in the European application No. 20955722.2, mailed on Oct. 11, 2023, 9 pages.

* cited by examiner

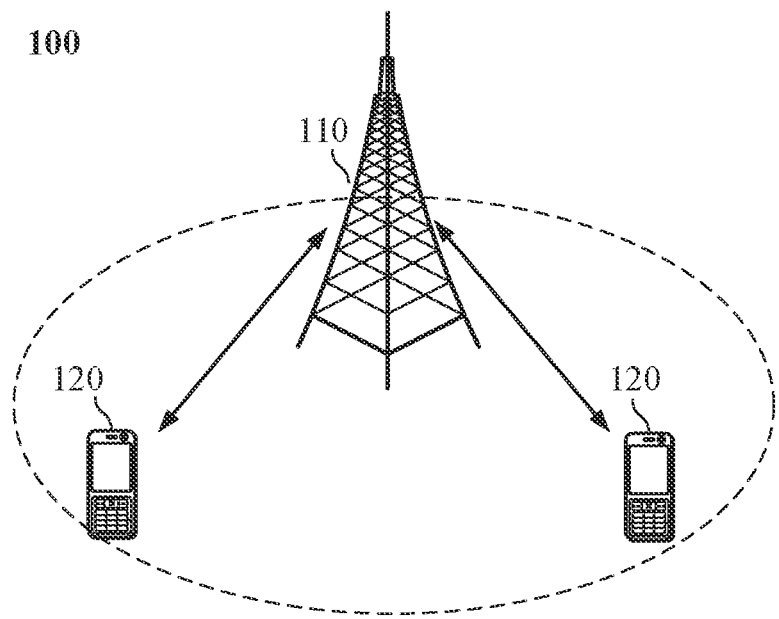
FIG. 1
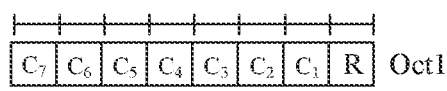
FIG. 2A
| $C_7$ | $C_6$ | $C_5$ | $C_4$ | $C_3$ | $C_2$ | $C_1$ | R | Oct1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct2 |
| $C_{23}$ | $C_{22}$ | $C_{21}$ | $C_{20}$ | $C_{19}$ | $C_{18}$ | $C_{17}$ | $C_{16}$ | Oct3 |
| $C_{31}$ | $C_{30}$ | $C_{29}$ | $C_{28}$ | $C_{27}$ | $C_{26}$ | $C_{25}$ | $C_{24}$ | Oct4 |
FIG. 2B

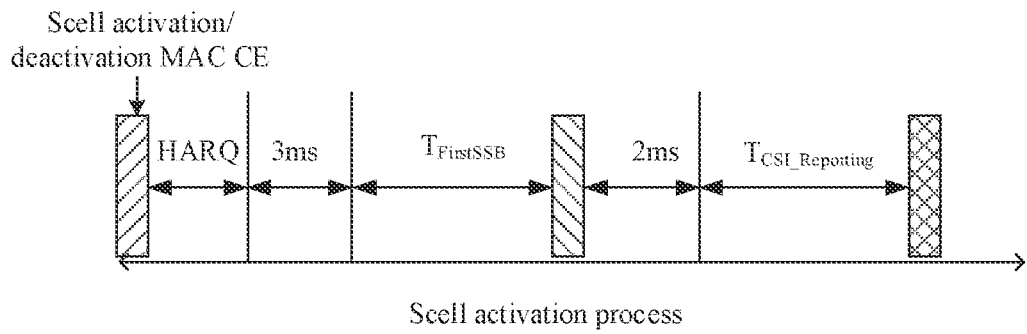
FIG. 3
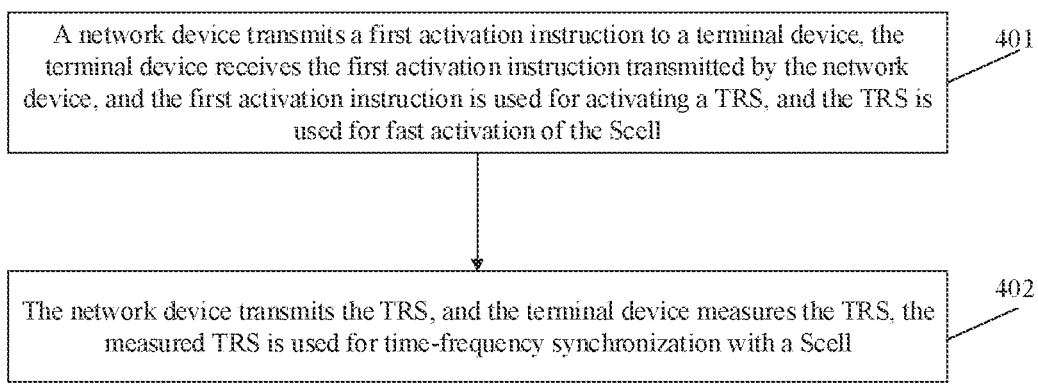
FIG. 4
| C7 | C6 | C5 | C4 | C3 | C2 | C1 | C0 |
|----|----|----|----|----|----|----|----|
| C7 | C6 | C5 | C4 | C3 | C2 | C1 | C0 |
|----|----|----|----|----|----|----|----|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
FIG. 5A

| C7 | C6 | C5 | C4 | C3 | C2 | C1 | C0 |
|----|----|----|----|----|----|----|----|
| Ch | Cg | Cf | Ce | Cd | Cc | Cb | Ca |

| C7  | C6  | C5  | C4  | C3  | C2  | C1  | C0  |
|-----|-----|-----|-----|-----|-----|-----|-----|
| C15 | C14 | C13 | C12 | C11 | C10 | C9  | C8  |
| C23 | C22 | C21 | C20 | C19 | C18 | C17 | C16 |
| C31 | C30 | C29 | C28 | C27 | C26 | C25 | C24 |
| Ch  | Cg  | Cf  | Ce  | Cd  | Cc  | Cb  | Ca  |

FIG. 5B

| C7   | C6   | C5   | C4   | C3   | C2   | C1   | C0 |
|------|------|------|------|------|------|------|----|
| ...... |
| Cn+7 | Cn+6 | Cn+5 | Cn+4 | Cn+3 | Cn+2 | Cn+1 | Cn |

FIG. 5C

| A/D | Serving Cell ID | BWP ID | Oct 1 |
|-----|-----------------|--------|-------|
| R | IM | SP CSI-RS resource set ID | Oct 2 |
| R | R | SP CSI-IM resource set ID | Oct 3 |
| R | | TCI State $ID_0$ | Oct 4 |
| | | ... | |
| R | | TCI State $ID_N$ | Oct N+4 |

FIG. 6A

| A/D | Serving Cell ID | BWP ID | Oct 1
| R | IM | TRS resource set ID | Oct 2

FIG. 6B

| A/D | Serving Cell ID | BWP ID | Oct 1

FIG. 6C

| A/D | Serving Cell ID | Oct 1

FIG. 6D

| A/D | Serving Cell ID | Oct 1
| R | IM | TRS resource set ID | Oct 2

FIG. 6E

METHOD AND APPARATUS FOR TRIGGERING TRS ACTIVATION, TERMINAL DEVICE, AND NETWORK DEVICE

CROSS-REFERENCE TO RELATED APPLICATION

This application is a continuation of International Patent Application No. PCT/CN2020/119467 filed on Sep. 30, 2020. The entire content of the prior application is incorporated by reference herein in its entirety.

BACKGROUND

A Secondary Cell (Scell) is configured via Radio Resource Control (RRC) dedicated signaling, a state of initial configuration of the Scell is an inactive state, and data cannot be transmitted and received in this state. Data can only be transmitted and received by activating the Scell through a Media Access Control Control Element (MAC CE).

At present, a latency is required from the activation of an Scell via a MAC CE to true transmission of data, and the latency includes a receiving latency of a Synchronization Signal Block (SSB). However, considering that the time of an SSB period may be long, the time when the Scell is actually activated (namely, the time when the data can be transmitted) will be affected. Therefore, a terminal device may be assisted by a TRS to achieve the purpose of fast activation for the Scell. However, how to activate the TRS is an explicit problem.

SUMMARY

Embodiments of the present disclosure provide a method and device for TRS activation, a terminal device, and a network device.

The method for TRS activation provided by an embodiment of the present disclosure may include the following operations. A terminal device receives a first activation instruction transmitted by a network device. The first activation instruction is used for activating a TRS. The TRS is used for fast activation of an Scell. The terminal device measures the TRS. The measured TRS is used for time-frequency synchronization with an Scell.

The method for TRS activation provided by an embodiment of the present disclosure may include the following operations. A network device transmits a first activation instruction to a terminal device. The first activation instruction is used for activating a TRS. The TRS is used for fast activation of an Scell. The network device transmits the TRS. The TRS is used for time-frequency synchronization between the terminal device and an Scell.

The terminal device provided by an embodiment of the present disclosure may include a processor and a memory. The memory is configured to store a computer program. The processor is configured to call and execute the computer program stored in the memory to perform the above-mentioned method for TRS activation.

BRIEF DESCRIPTION OF THE DRAWINGS

The accompanying drawings described herein are used to provide a further understanding of the present disclosure, and constitute a part of the present disclosure. The exemplary embodiments of the present disclosure and the description thereof are used to explain the present disclosure, but do not constitute improper limitations to the present disclosure. In the accompanying drawings:

FIG. 1 illustrates a schematic diagram of communication system architecture provided by an embodiment of the present disclosure;

FIG. 2A illustrates a first schematic diagram of an Scell activation/deactivation MAC CE provided by an embodiment of the present disclosure;

FIG. 2B illustrates a second schematic diagram of an Scell activation/deactivation MAC CE provided by an embodiment of the present disclosure;

FIG. 3 illustrates a schematic diagram of an Scell activation latency provided by an embodiment of the present disclosure;

FIG. 4 illustrates a schematic flowchart of a method for TRS activation provided by an embodiment of the present disclosure;

FIG. 5A illustrates a first schematic diagram of a MAC CE for activating TRS provided by an embodiment of the present disclosure;

FIG. 5B illustrates a second schematic diagram of a MAC CE for activating TRS provided by an embodiment of the present disclosure;

FIG. 5C illustrates a third schematic diagram of a MAC CE for activating TRS provided by an embodiment of the present disclosure;

FIG. 6A illustrates a fourth schematic diagram of a MAC CE for activating TRS provided by an embodiment of the present disclosure;

FIG. 6B illustrates a fifth schematic diagram of a MAC CE for activating TRS provided by an embodiment of the present disclosure;

FIG. 6C illustrates a sixth schematic diagram of a MAC CE for activating TRS provided by an embodiment of the present disclosure;

FIG. 6D illustrates a seventh schematic diagram of a MAC CE for activating TRS provided by an embodiment of the present disclosure;

FIG. 6E illustrates an eighth schematic diagram of a MAC CE for activating TRS provided by an embodiment of the present disclosure;

DETAILED DESCRIPTION

Figure 7:
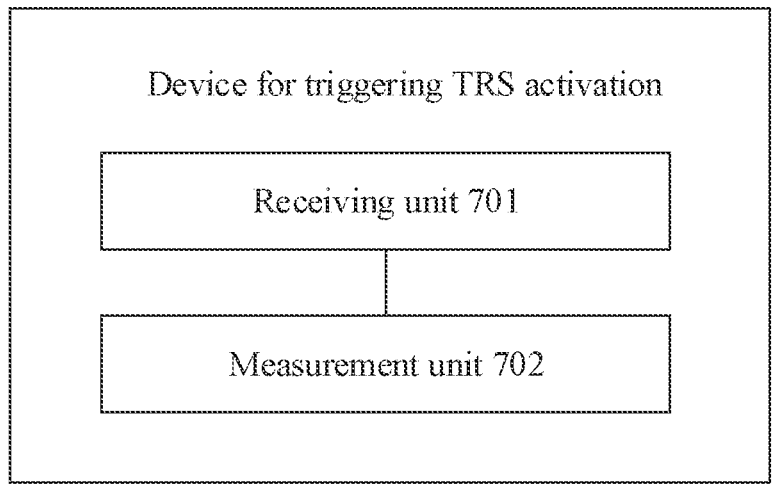
FIG. 7 illustrates a first schematic diagram of structural compositions of a device for triggering TRS activation provided by an embodiment of the present disclosure.

The technical solutions in the embodiments of the present disclosure are described below with reference to the accompanying drawings in the embodiments of the present disclosure. It is apparent that the described embodiments are part rather than all embodiments of the present disclosure. All other embodiments obtained by those of ordinary skill in the art based on the embodiments of the present disclosure without inventive efforts shall fall within the scope of protection of the present disclosure.

The technical solutions of the embodiments of the present disclosure may be applied to various communication systems, for example, a Long Term Evolution (LTE) system, an LTE Frequency Division Duplex (FDD) system, an LTE Time Division Duplex (TDD) system, a 5G (5th generation) communication system, a future communication system, etc.

Exemplarily, the communication system 100 to which the embodiments of the present disclosure are applied is as shown in FIG. 1. The communication system 100 may include a network device 110. The network device 110 may be a device in communication with a terminal device 120 (or referred to as a communication terminal device or a terminal device). The network device 110 may provide communication coverage for a specific geographical area, and may communicate with a terminal device located within the coverage. Optionally, the network device 110 may be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in a 5G network, or a network device in a future communication system.

The communication system 100 further includes at least one terminal device 120 located within the coverage of the network device 110. A "terminal device" used herein includes, but not is limited to, an apparatus arranged to receive/transmit a communication signal through a wired line connection, such as through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or a device of another terminal arranged to receive/transmit the communication signal, and/or an Internet of Things (IoT) device. The terminal device arranged to communicate through a wireless interface may be referred to as a "wireless communication terminal device", a "wireless terminal device" or a "mobile terminal device". Examples of the mobile terminal device include, but are not limited to, satellite or cellular phones, Personal Communications System (PCS) terminal devices that can combine cellular radiotelephones with data processing, fax, and data communication capabilities, PDAs that may include radiotelephones, pagers, Internet/Intranet access, Web browsers, notebooks, calendars, and/or Global Positioning System (GPS) receivers, and conventional laptop and/or hand-held receivers or other electronic devices including radiotelephone transceivers. The terminal device may also be referred to as an access terminal device, a User Equipment (UE), a subscriber unit, a subscriber station, a mobile station, a mobile console, a remote station, a remote terminal device, a mobile device, a user terminal device, a terminal device, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a hand-held device having a wireless communication function, a computing device or another processing device connected to a wireless modem, an on-board device, a wearable device, a terminal device in a 5G network, a terminal device in a PLMN in future evolution, or the like.

Optionally, Device to Device (D2D) communication may be performed between the terminal devices 120.

Optionally, a 5G communication system or a 5G network may also be referred to as a New Ratio (NR) system or an NR network.

FIG. 1 exemplarily illustrates one network device and two terminal devices. Optionally, the communication system 100 may include a plurality of network devices and the coverage of each network device may include other numbers of terminal devices. No limits are made thereto in the embodiments of the present disclosure.

Optionally, the communication system 100 may further include other network entities, such as a network controller and a mobile management entity. No limits are made thereto in the embodiments of the present disclosure.

It is to be understood that a device with a communication function in a network/system in the embodiments of the present disclosure may be referred to as a communication device. Taking a communication system 100 as shown in FIG. 1 as an example, the communication device may include a network device 110 and a terminal device 120 with a communication function. The network device 110 and the terminal device 120 may be specific devices as described above, which will not be elaborated here. The communication device may also include other devices in the communication system 100, for example, other network entities, such as a network controller and a mobile management entity. No limits are made thereto in the embodiments of the present disclosure.

It is to be understood that the terms "system" and "network" herein are often used interchangeably herein. The term "and/or" herein is only an association relationship for describing associated objects and indicates that three relationships may exist. For example, A and/or B may indicate the following three cases: only A exists, both A and B exist, or only B exists. In addition, the character "/" herein generally indicates that the contextual objects are in an "or" relationship.

In order to facilitate the understanding of the technical solutions of the embodiments of the present disclosure, the technical solutions related to the embodiments of the present disclosure are described below.

With the pursuit of speed, delay, high-speed mobility, energy efficiency, and the diversity and complexity of services in future life, the 3rd Generation Partnership Project (3GPP) International Standard Organization began to develop 5G. The main application scenarios for 5G include enhanced Mobile Broadband (eMBB), Ultra-Reliable Low-Latency Communications (URLLC), and massive Machine-Type Communications (mMTC).

On the one hand, eMBB still targets users to obtain multimedia content, services and data, and the demand grows very fast. On the other hand, since eMBB may be deployed in different scenarios, such as indoors, urban areas, and rural areas, and the difference in capabilities and demands of the eMBB is large, this cannot be generalized, and a detailed analysis must be made in combination with specific deployment scenarios. Typical applications of URLLC include: industrial automation, power automation, telemedicine operation (surgery), traffic safety assurance, etc. Typical features of mMTC include: high connection density, small data volume, latency insensitive services, low cost of modules, long service life, etc.

In the early NR deployment, complete NR coverage is difficult to obtain, and therefore the typical network coverage is wide-area LTE coverage and NR islanding coverage modes. Moreover, a large number of LTE are deployed below 6 GHz, with little spectrum below 6 GHz available for 5G. Therefore, NR must study more than 6 GHz spectrum applications, while high-band coverage is limited and signal fading is fast. Meanwhile, in order to protect the previous investment of mobile operators in LTE, a tight interworking mode between LTE and NR is proposed.

NR may also be deployed independently. NR will be deployed at high frequencies in the future. In order to improve coverage, the requirement for coverage (coverage by space, space by time) is met by introducing a mechanism of beam sweeping in 5G. After the introduction of beam sweeping, a synchronization signal needs to be transmitted in each beam direction, and the synchronization signal of 5G is given in the form of an SS/PBCH block (SSB), including a Primary Synchronization Signal (PSS), a Secondary Synchronization Signal (SSS), and a Physical Broadcast Channel (PBCH). The synchronization signal of 5G occurs periodically in a time domain in the form of an SS burst set.

The number of beam actually transmitted by each cell is determined through network side configuration, but a frequency point where the cell is located determines the number of beams which may be configured at most, as shown in the following Table 1.

TABLE 1

| Frequency range | L (maximum number of beams) |
| --- | --- |
| up to 3 (2.4) GHz | 4 |
| 3 (2.4) GHz - 6 GHz | 8 |
| 6 GHz - 52.6 GHz | 64 |

For SSB-based measurements, each cell may have different actual transmission positions of the SSB and different SS burst set periods. Therefore, in order to enable a UE to save energy in a measurement process, a network side configures the UE with SS/PBCH block measurement timing configuration (SMTC), and the UE only needs to perform measurement in an SMTC window.

In 5G, the maximum channel bandwidth may be 400 MHZ (referred to as wideband carrier), and the bandwidth of the wideband carrier is large compared to the maximum 20M bandwidth of LTE. If the terminal device remains operating on the wideband carrier, the power consumption of the terminal device is very large. Therefore, it is suggested that a Radio Frequency (RF) bandwidth of the terminal device may be adjusted according to the actual throughput of the terminal device. To this end, the concept of a Band Width Part (BWP) is introduced. The motivation of the BWP is to optimize the power consumption of the terminal device. For example, if the terminal device has a low rate, the terminal device may be configured with a smaller BWP, and if the terminal device has a high rate requirement, the terminal device may be configured with a larger BWP. If the terminal device supports high rates, or operates in a Carrier Aggregation (CA) mode, the terminal device may be configured with a plurality of BWPs. Another purpose of the BWP is to trigger the coexistence of a plurality of numerologies in a cell. For example, BWP1 corresponds to the first numerology, and BWP2 corresponds to the second numerology.

A terminal device may be configured with at most 4 uplink BWPs and at most 4 downlink BWPs through RRC dedicated signaling, but only one uplink BWP and one downlink BWP can be activated at the same time. In RRC dedicated signaling, the first active BWP in the configured BWPs may be indicated. Meanwhile, it is also possible to switch between different BWPs through Downlink Control Information (DCI) when the terminal device is in a connected state. When a carrier in an inactive state enters to an active state, the first active BWP is the first active BWP configured in the RRC dedicated signaling.

Configuration parameters of each BWP include:
  subcarrier spacing;
  cyclic prefix;
  first Physical Resource Block (PRB) of BWP and number of consecutive PRBs (locationAndBandwidth);
  BWP Identifier (bwp-Id);
  BWP common configuration parameter and dedicated configuration parameter (bwp-Common, bwp-Dedicated).

In the process of Radio Link Monitor (RLM), the terminal device only executes on the active BWP, and the inactive BWP does not need to operate. When switching between different BWPs, the terminal device also does not need to reset an RLM-related timer and counter. Radio Resource Management (RRM) measurements will not be affected regardless of a certain active BWP on which the terminal device transmits and receives data. For the measurement of Channel Quality Indication (CQI), the terminal device also only needs to perform on the active BWP.

When a carrier is deactivated and then activated by a MAC CE, the initial first active BWP is the first active BWP configured in the RRC dedicated signaling.

The value of the BWP identifier (BWP id) in the RRC dedicated signaling is 0 to 4, and the BWP with the BWP identifier of 0 is an initial BWP in default.

A BWP indicator is 2 bits in DCI as shown in Table 2 below. If the number of configured BWPs is less than or equal to 3, BWP indicator=1, 2, 3 corresponds to BWP id=1, 2, 3, respectively. If the number of BWPs is 4, BWP indicator=0, 1, 2, 3 corresponds to BWPs configured according to a sequential index, respectively. The network side uses consecutive BWP ids when configuring the BWP.

TABLE 2

| Value of BWP indicator (2 bits) | BWP |
| --- | --- |
| 00 | First BWP configured at high level |
| 01 | Second BWP configured at high level |
| 10 | Third BWP configured at high level |
| 11 | Fourth BWP configured at high level |

To meet the high rate requirement, a CA technology is also supported in 5G. The CA enables an NR system to support a greater bandwidth by jointly scheduling and using resources on a plurality of Component Carriers (CCs), thereby implementing higher system peak rates. According to the continuity of aggregated carriers in a frequency spectrum, CA may be divided into continuous CA and non-continuous CA. CA may be divided into intra-band CA and inter-band CA according to whether bands where the aggregated carriers are located are the same.

In CA, there is and only one Primary Cell Component (PCC). The PCC provides an RRC signaling connection, a Non-Access Stratum (NAS) function, security, etc. A Physical Downlink Control Channel (PUCCH) is on the PCC and only exists on the PCC. In CA, there may be one or more Secondary Cell Component (SCC). The SCC provides only additional radio resources. The PCC and the SCC are collectively referred to as a serving cell. A cell on the PCC is a Pcell and a cell on the SCC is an Scell. It is also specified in the standard that at most 5 aggregated carriers are supported. That is, the maximum bandwidth after aggregation is 100 MHZ, and the aggregated carriers belong to the same base station. All aggregated carriers use the same Cell-Radio Network Temporary Identifier (C-RNTI), and the base station ensures that the C-RNTI does not collide in the cell where each carrier is located. Since both asymmetric carrier aggregation and symmetric carrier aggregation are supported, it is required that the aggregated carriers must have downlink carriers and may have no uplink carriers. Moreover, for a primary carrier cell, there must be a Physical Downlink Control Channel (PDCCH) and PUCCH of the cell. Only the primary carrier cell has the PUCCH, and other secondary carrier cells may have the PDCCH.

A Scell is configured via RRC dedicated signaling, a state of initial configuration is an inactive state, and data cannot be transmitted and received in this state. Data can only be transmitted and received by activating the Scell through a MAC CE. As shown in FIG. 2A and FIG. 2B, an Scell activation/deactivation MAC CE includes 1 byte and controls the state of 7 Scells in FIG. 2A. The Scell activation/deactivation MAC CE includes 4 bytes and controls the state of 31 Scells in FIG. 2B. $C_i$ represents a state corresponding to an Scell with a serving cell index of i. $C_i$ is set to 1, representing that the corresponding Scell is in an inactive state (i.e. a deactivated state). $C_i$ is set to 0, representing that the corresponding Scell is in an active state.

A latency is required from the activation of an Scell to true transmission of data by using the Scell activation/deactivation MAC CE. As shown in FIG. 3, after the terminal device receives the Scell activation/deactivation MAC CE, there is a Hybrid Automatic Repeat Request (HARQ) feedback latency of $T_{HARQ}$ (the HARQ feedback refers to a HARQ feedback for the Scell activation/deactivation MAC CE), then there is an 3 ms application latency of the Scell activation/deactivation MAC CE, and then it is considered that the Scell is activated. In order to actually be able to transmit data, the terminal device needs to detect the first SSB on the Scell so as to use the SSB to implement time-frequency synchronization with the Scell, which will have an SSB detection latency of $T_{FirstSSB}$, a 2 ms latency of SSB processing and radio frequency preparation, and then a CSI reporting latency of $T_{CSI\_Reporting}$. Among the latency factors mentioned above, considering that the length of an SMTC (i.e. a time window used to detect the SSB) period may be large, which will affect the time when the Scell is actually activated (i.e. the time when data can actually be transmitted), a TRS is introduced to assist the terminal device to fast activate the Scell. How to activate the TRS is an explicit problem. To this end, the following technical solutions of the embodiments of the present disclosure are proposed.

It is to be noted that the "network device" in the embodiment of the present disclosure may be a base station, such as gNB.

FIG. 4 illustrates a schematic flowchart of a method for TRS activation provided by an embodiment of the present disclosure. As shown in FIG. 4, the method for TRS activation includes the steps S401 to S402.

In step 401, a network device transmits a first activation instruction to a terminal device. The terminal device receives the first activation instruction transmitted by the network device. The first activation instruction is used for activating a TRS. The TRS is used for fast activation of an Scell.

In the embodiments of the present disclosure, before a network device transmits a first activation instruction to a terminal device, namely, before the terminal device receives the first activation instruction transmitted by the network device, the method further includes the following operations.

The network device transmits first RRC signaling to the terminal device. The terminal device receives the first RRC signaling transmitted by the network device. The first RRC signaling includes TRS configuration information. The TRS configuration information includes first indication information. The first indication information is used for indicating a TRS type and/or a TRS purpose. The TRS type and/or the TRS purpose are used for determining that the TRS is used for fast activation of the Scell.

Further, optionally, the TRS configuration information further includes at least one of the following:

second indication information used for indicating the number of transmissions after the TRS is activated;

third indication information used for indicating a transmission interval of the TRS; or fourth indication information used for indicating a time offset.

In the embodiments of the present disclosure, the first RRC signaling includes a non-zero power CSI-RS resource set configuration and a CSI resource configuration. The TRS configuration information is configured to be in the non-zero power CSI-RS resource set configuration or the CSI resource configuration.

How to configure the TRS configuration information is described below with reference to specific examples.

In an example, the TRS configuration information is configured through dedicated RRC signaling (i.e. first RRC signaling), and a TRS type and/or a TRS purpose (i.e. first indication information) is configured in the dedicated RRC signaling. The TRS type and/or the TRS purpose is used for indicating whether the TRS is used for fast activation of the Scell or for other (for example, time-frequency tracking of a channel). Optionally, the dedicated RRC signaling may also configure the number of transmissions after TRS is activated and/or a transmission interval of the TRS (referred to as trs-Interval). The measurement unit of the value of trs-Interval may be milliseconds (ms) or the number of slots. If the measurement unit of the value of trs-Interval is the number of slots, the length of the slot is consistent with the length of slot in the unit of SCS of TRS. Optionally, the value of trs-Interval should be less than 10 ms. In specific implementation, referring to the following Tables 3-1 and 3-2, the structural hierarchy of the configuration information included in the dedicated RRC signaling is as follows:

RRC reconfiguration (RRCReconfiguration)→

Cell group configuration (CellGroupConfig)→

Serving cell configuration (ServingCellConfig)→

CSI measurement configuration (csi-MeasConfig)→

Non-zero power CSI-RS resource set configuration (NZP-CSI-RS-ResourceSet).

TABLE 3-1

| | |
|---|---|
| CSI-MeasConfig ::= | SEQUENCE { |
| nzp-CSI-RS-ResourceToAddModList | SEQUENCE (SIZE (1..maxNrofNZP-CSI-RS-Resources)) OF NZP-CSI-RS-Resource OPTIONAL, -- Need N |
| nzp-CSI-RS-ResourceToReleaseList | SEQUENCE (SIZE (1..maxNrofNZP-CSI-RS-Resources)) OF NZP-CSI-RS-ResourceId OPTIONAL, -- Need N |
| nzp-CSI-RS-ResourceSetToAddModList | SEQUENCE (SIZE (1..maxNrofNZP-CSI-RS-ResourceSets)) OF NZP-CSI-RS-ResourceSet OPTIONAL, -- Need N |
| nzp-CSI-RS-ResourceSetToReleaseList | SEQUENCE (SIZE (1..maxNrofNZP-CSI-RS-ResourceSets)) OF NZP-CSI-RS-ResourceSetId OPTIONAL, -- Need N |
| csi-IM-ResourceToAddModList | SEQUENCE (SIZE (1..maxNrofCSI-IM-Resources)) OF CSI-IM-Resource OPTIONAL, -- Need N |
| csi-IM-ResourceToReleaseList | SEQUENCE (SIZE (1..maxNrofCSI-IM-Resources)) OF CSI-IM-ResourceId OPTIONAL, -- Need N |
| csi-IM-ResourceSetToAddModList | SEQUENCE (SIZE (1..maxNrofCSI-IM-ResourceSets)) OF CSI-IM-ResourceSet OPTIONAL, -- Need N |
| csi-IM-ResourceSetToReleaseList | SEQUENCE (SIZE (1..maxNrofCSI-IM-ResourceSets)) OF CSI-IM-ResourceSetId OPTIONAL, -- Need N |
| csi-SSB-ResourceSetToAddModList | SEQUENCE (SIZE (1..maxNrofCSI-SSB-ResourceSets)) OF CSI-SSB-ResourceSet OPTIONAL, -- Need N |
| csi-SSB-ResourceSetToReleaseList | SEQUENCE (SIZE (1..maxNrofCSI-SSB-ResourceSets)) OF CSI-SSB-ResourceSetId OPTIONAL, -- Need N |
| csi-ResourceConfigToAddModList | SEQUENCE (SIZE (1..maxNrofCSI-ResourceConfigurations)) OF CSI-ResourceConfig OPTIONAL, -- Need N |
| csi-ResourceConfigToReleaseList | SEQUENCE (SIZE (1..maxNrofCSI-ResourceConfigurations)) OF CSI-ResourceConfigId OPTIONAL, -- Need N |
| csi-ReportConfigToAddModList | SEQUENCE (SIZE (1..maxNrofCSI-ReportConfigurations)) OF CSI-ReportConfig OPTIONAL, -- Need N |
| csi-ReportConfigToReleaseList | SEQUENCE (SIZE (1..maxNrofCSI-ReportConfigurations)) OF CSI-ReportConfigId OPTIONAL, -- Need N |
| reportTriggerSize | INTEGER (0..6) OPTIONAL, -- Need M |
| aperiodicTriggerStateList | SetupRelease { CSI-AperiodicTriggerStateList } OPTIONAL, -- Need M |
| semiPersistentOnPUSCH-TriggerStateList | SetupRelease { CSI-SemiPersistentOnPUSCH-TriggerStateList } OPTIONAL, -- Need M |
| ..., [[ | |
| reportTriggerSizeForDCI-Format0-2-r16 | INTEGER (0..6) OPTIONAL -- Need R |
| ]] } | |

TABLE 3-2

| | |
|---|---|
| NZP-CSI-RS-ResourceSet ::= | SEQUENCE { |
| nzp-CSI-ResourceSetId | NZP-CSI-RS-ResourceSetId, |
| nzp-CSI-RS-Resources | SEQUENCE (SIZE (1..maxNrofNZP-CSI-RS-ResourcesPerSet)) OF NZP-CSI-RS-ResourceId, |
| repetition | ENUMERATED { on, off } OPTIONAL, -- Need S |
| aperiodicTriggeringOffset | INTEGER(0..6) OPTIONAL, -- Need S |
| trs-Info | ENUMERATED {true} OPTIONAL, -- Need R |
| ..., [[ | |
| aperiodicTriggeringOffset-r16 | INTEGER(0..31) OPTIONAL -- Need S |
| ]] } | |
| NZP-CSI-RS-Resource ::= | SEQUENCE { |
| nzp-CSI-RS-ResourceId | NZP-CSI-RS-ResourceId, |
| resourceMapping | CSI-RS-ResourceMapping, |
| powerControlOffset | INTEGER (-8..15), |
| powerControlOffsetSS | ENUMERATED{db-3, db0, db3, db6} OPTIONAL, -- Need R |
| scramblingID | ScramblingId, |
| periodicityAndOffset | CSI-ResourcePeriodicityAndOffset |

TABLE 3-2-continued

```
OPTIONAL, -- Cond PeriodicOrSemiPersistent
    qcl-InfoPeriodicCSI-RS         TCI-StateId
OPTIONAL, -- Cond Periodic
    ...
}
```

In an optional manner, the TRS configuration information is configured to be in NZP-CSI-RS-ResourceSet. Referring to the following Table 4-1, trs-Type or trs-Purpose represents the first indication information, and there may be three implementations. trs-Amount represents the second indication information. trs-Interval represents the third indication information. offset represents the fourth indication information.

TABLE 4-1

```
NZP-CSI-RS-ResourceSet ::=          SEQUENCE {
    nzp-CSI-ResourceSetId               NZP-CSI-RS-ResourceSetId,
    nzp-CSI-RS-Resources                SEQUENCE (SIZE (1..maxNrofNZP-CSI-RS-ResourcesPerSet))
 OF NZP-CSI-RS-ResourceId,
    repetition                          ENUMERATED { on, off }
OPTIONAL, -- Need S
    aperiodicTriggeringOffset           INTEGER(0..6)
OPTIONAL, -- Need S
    trs-Info                            ENUMERATED {true}
OPTIONAL, -- Need R
    ...,
    [[
    aperiodicTriggeringOffset-r16       INTEGER(0..31)
OPTIONAL -- Need S
    ]]
    [[
    Option 1.1
    trs-Type or trs-Purpose             ENUMERATED {ScellActivation, spare2, spare1,
    spare 0}                                OPTIONAL -- Need S
    Option 1.2
    trs-Type or trs-Purpose             ENUMERATED {ScellActivation, tracking}
OPTIONAL -- Need S
    Option 1.3
    trs-Type or trs-Purpose             ENUMERATED {ScellActivation}
OPTIONAL -- Need S
    ]]
    [[
    trs-Amount                          Enumerated {one, two, three, periodical}
OPTIONAL -- Need S
    trs-Interval                        Enumerated {w, x, y, z}
OPTIONAL -- Need S
    ]]
    [[
    offset                              ENUMERATED {one, two, three, four}
OPTIONAL -- Need S
    ]]
}
```

In an optional manner, the TRS configuration information is configured to be in CSI-ResourceConfig. Referring to the following Table 4-2, trs-Type or trs-Purpose represents the first indication information, and there may be three implementations. trs-Amount represents the second indication information. trs-Interval represents the third indication information. offset represents the fourth indication information.

TABLE 4-2

```
CSI-ResourceConfig ::=              SEQUENCE {
    csi-ResourceConfigId                CSI-ResourceConfigId,
    csi-RS-ResourceSetList              CHOICE {
        nzp-CSI-RS-SSB                      SEQUENCE {
            nzp-CSI-RS-ResourceSetList          SEQUENCE (SIZE (1..maxNrofNZP-CSI-RS-
ResourceSetsPerConfig)) OF NZP-CSI-RS-ResourceSetId        OPTIONAL, -- Need R
            csi-SSB-ResourceSetList             SEQUENCE (SIZE (1..maxNrofCSI-SSB-
ResourceSetsPerConfig)) OF CSI-SSB-ResourceSetId           OPTIONAL -- Need R
        },
        csi-IM-ResourceSetList              SEQUENCE (SIZE (1..maxNrofCSI-IM-ResourceSetsPerConfig))
 OF CSI-IM-ResourceSetId
```

TABLE 4-2-continued

| | |
|---|---|
| },  bwp-Id | BWP-Id, |
| resourceType | ENUMERATED { aperiodic, semiPersistent, periodic }, |
| ... | |
| [[ | |
| Option 2.1 | |
| trs-Type or trs-Purpose | ENUMERATED {ScellActivation, spare2, spare1, |
| spare 0} | OPTIONAL -- Need S |
| Option 2.2 | |
| trs-Type or trs-Purpose | ENUMERATED {ScellActivation, tracking} |
| OPTIONAL -- Need S | |
| Option 2.3 | |
| trs-Type or trs-Purpose | ENUMERATED {ScellActivation} |
| OPTIONAL -- Need S | |
| ]] | |
| [[ | |
| trs-Amount | ENUMERATED {one, two, three, periodical} |
| OPTIONAL -- Need S | |
| trs-Interval | Enumerated {w, x, y, z} |
| OPTIONAL -- Need S | |
| ]] | |
| [[ | |
| offset | ENUMERATED {one, two, three, four} |
| OPTIONAL -- Need S | |
| ]] | |
| } | |

In step 402, the network device transmits the TRS. The terminal device measures the TRS. The measured TRS is used for time-frequency synchronization with an Scell.

In an optional manner, the first activation instruction is used for activating the TRS, the activation time of the TRS refers to the time when the network device starts to measure the TRS, or the activation time of the TRS refers to the time when the network device starts to transmit the TRS. The implementation of the first activation instruction and how to define "time for starting to measure a TRS" or "time for starting to transmit a TRS" is described below.

First Manner

The first activation instruction is a first MAC CE. The first MAC CE is an Scell activation/deactivation MAC CE.

For a terminal device, if the Scell satisfies a first condition, the terminal device starts to measure the TRS at a first time. The definition of the first time is described below.

1) The first time is the time when the terminal device receives the first MAC CE; or
2) the first time is the time when the terminal device receives a PDSCH corresponding to the first MAC CE; or
3) the first time is the time when the terminal device receives the first MAC CE plus a time offset; or
4) the first time is the time when the terminal device receives a PDSCH corresponding to the first MAC CE plus a time offset; or
5) the first time is the time when the terminal device has fed back Hybrid Automatic Repeat Request Acknowledgement (HARQ ACK) information corresponding to the first MAC CE; or
6) the first time is the time when the terminal device has fed back HARQ ACK information corresponding to the first MAC CE plus a time offset.

In the above solution, the time offset is a fixed value or configured by a network device. Further, optionally, if the time offset is a fixed value, there is an association relationship between the value of the time offset and the capability of the terminal device.

The technical solutions of the embodiments of the present disclosure are exemplified below in combination with specific disclosure examples.

In an example, a terminal device receives an Scell activation/deactivation MAC CE. If a certain Scell satisfies a first condition, the terminal device starts to measure a TRS at a first time, and performs time-frequency synchronization with the Scell based on the measured TRS, so as to implement fast activation of the Scell. Herein, the first time has the following definitions:

the time when the terminal device receives the Scell activation/deactivation MAC CE, namely, the time when a MAC layer of the terminal device decodes the Scell activation/deactivation MAC CE or the time when a physical layer of the terminal device receives a PDSCH corresponding to the Scell activation/deactivation MAC CE; or the time when the terminal device has fed back HARQ ACK information of the Scell activation/deactivation MAC CE, namely, the time when the terminal device has fed back HARQ ACK information of a TB where the Scell activation/deactivation MAC CE is located or the time when the terminal device has fed back HARQ ACK information of a PDSCH corresponding to the Scell activation/deactivation MAC CE.

The first time may also be the above time plus a time offset, and the value of this offset may be a fixed value or a value configured by a network side. If it is a fixed value, the fixed value may be a fixed value having a relationship with the capability of the terminal device. For example, the fixed value corresponding to the first capability in UE processing capability and the fixed value corresponding to the second capability in UE processing capability are different. For example, fixed values (1, 2) or (2, 3) correspond to the first capability and second capability, respectively. The measurement unit of the value of the offset may be ms or the number of slots. If it is the number of slots, the length of the slot is consistent with the length of slot in the unit of the SCS of the PDSCH where the MAC CE is located.

For a network device, if the Scell satisfies a first condition, the network device starts to transmit the TRS at a first time. The definition of the first time is described below.

1) The first time is the time when the network device has transmitted the first MAC CE; or 2) the first time is the time when the network device has transmitted a PDSCH corresponding to the first MAC CE; or
3) the first time is the time when the network device has transmitted the first MAC CE plus a time offset; or
4) the first time is the time when the network device has transmitted a PDSCH corresponding to the first MAC CE plus a time offset; or
5) the first time is the time when the network device receives HARQ ACK information corresponding to the first MAC CE; or
6) the first time is the time when the network device receives HARQ ACK information corresponding to the first MAC CE plus a time offset.

In the above solution, the time offset is a fixed value or configured by a network device. Further, optionally, if the time offset is a fixed value, there is an association relationship between the value of the time offset and the capability of the terminal device.

The technical solutions of the embodiments of the present disclosure are exemplified below in combination with specific disclosure examples.

In an example, a base station transmits an Scell activation/deactivation MAC CE. If a certain Scell satisfies a first condition, the base station starts to transmit a TRS at a first time. Herein, the first time has the following definitions:

the time when the base station has transmitted the Scell activation/deactivation MAC CE, namely, the time when the base station has transmitted a PDSCH corresponding to the Scell activation/deactivation MAC CE;

the time when the base station receives HARQ ACK information of the Scell activation/deactivation MAC CE, namely, the time when the base station receives HARQ ACK information of a TB where the Scell activation/deactivation MAC CE is located or the time when the base station receives HARQ ACK information of a PDSCH corresponding to the Scell activation/deactivation MAC CE.

The first time may also be the above time plus a time offset, and the value of this offset may be a fixed value or a value configured by a network side. If it is a fixed value, the fixed value may be a fixed value having a relationship with the capability of the terminal device. For example, the fixed value corresponding to the first capability in UE processing capability and the fixed value corresponding to the second capability in UE processing capability are different. For example, fixed values (1, 2) or (2, 3) correspond to the first capability and the second capability, respectively. The measurement unit of the value of the offset may be ms or the number of slots. If it is the number of slots, the length of the slot is consistent with the length of slot in the unit of the SCS of the PDSCH where the MAC CE is located.

In the above solution, the Scell satisfying a first condition includes at least one of the following:

I) The Scell is changed from a deactivated state to an active state.

Herein, the Scell needs to be activated from the deactivated state in order to be required for time-frequency synchronization with the Scell, and thus the TRS needs to be activated.

II) The first active BWP of the Scell is not set as a dormant BWP.

Herein, firstActiveDownlinkBWP-Id of the Scell is not set as a dormant BWP. Herein, firstActiveDownlinkBWP-Id is an identifier of the first active BWP. After the Scell enters an active state, the first active BWP configured by RRC signaling will be entered, and data transmission will be performed on the first active BWP only if the first active BWP is not a dormant BWP. Thus, it is required to activate the TRS.

III) The first active BWP of the Scell is configured with a TRS and the TRS is used for Scell activation.

Herein, firstActiveDownlinkBWP-Id of the Scell is configured with a TRS and the TRS is used for fast activation of the Scell. In this case, there is a precondition for activating the TRS.

It is to be noted that the description of the first condition in the following examples can be understood with reference to the above solution, and will not be elaborated.

Second Manner

The first activation instruction is second RRC signaling. The second RRC signaling is used for configuring at least one Scell. An initial state of the at least one Scell is an active state.

For a terminal device, if the Scell satisfies a first condition, the terminal device starts to measure the TRS at a second time. The definition of the second time is described below.

1) The second time is the time when the terminal device receives the second RRC signaling; or
2) the second time is the time when the terminal device receives a PDSCH corresponding to the second RRC signaling; or
3) the second time is a time offset plus the time when the terminal device receives the second RRC signaling; or
4) the second time is the time when the terminal device receives a PDSCH corresponding to the second RRC signaling plus a time offset; or,
5) the second time is the time when the terminal device has received and decoded the second RRC signaling; or
6) the second time is the time when the terminal device has received and decoded the second RRC signaling plus a time offset; or
7) the second time is the time when the terminal device completes activation of a first active BWP of the Scell after receiving the second RRC signaling; or
8) the second time is the time when the terminal device completes activation of a first active BWP of the Scell after receiving the second RRC signaling plus a time offset; or,
9) the second time is the time when the terminal device has fed back HARQ ACK information corresponding to the second RRC signaling; or
10) the second time is the time when the terminal device has fed back HARQ ACK information corresponding to the second RRC signaling plus a time offset.

In the above solution, the time offset is a fixed value or configured by a network device. Further, optionally, if the time offset is a fixed value, there is an association relationship between the value of the time offset and the capability of the terminal device.

The technical solutions of the embodiments of the present disclosure are exemplified below in combination with specific disclosure examples.

In an example, a terminal device receives second RRC signaling (hereinafter simply referred to as RRC signaling), the RRC signaling configures at least one Scell, and the at least one Scell configures an initial RRC state to be an active state. If a certain Scell satisfies a first condition, the terminal device starts to measure a TRS at a second time, and performs time-frequency synchronization with the Scell based on the measured TRS, so as to implement fast activation of the Scell. Herein, the second time has the following definitions:

the time when the terminal device receives RRC signaling, namely, the time when the physical layer of the terminal device receives a PDSCH corresponding to the RRC signaling;

the time when the terminal device has received RRC signaling and decoded the RRC signaling;

the time when the terminal device receives RRC signaling and completes activation of a BWP indicated by firstActiveDownlinkBWP-Id;

the time when the terminal device has fed back HARQ ACK information of RRC signaling after receiving the RRC signaling, namely, the time when the terminal device has fed back HARQ ACK information of a TB where the RRC signaling is located or the time when the terminal device has fed back HARQ ACK information of a PDSCH corresponding to the RRC signaling.

The second time may also be the above time plus a time offset, and the value of this offset may be a fixed value or a value configured by a network side. If it is a fixed value, the fixed value may be a fixed value having a relationship with the capability of the terminal device. For example, the fixed value corresponding to the first capability in UE processing capability and the fixed value corresponding to the second capability in UE processing capability are different. For example, fixed values (1, 2) or (2, 3) correspond to the first capability and second capability2, respectively. The measurement unit of the value of the offset may be ms or the number of slots. If it is the number of slots, the length of the slot is consistent with the length of slot in the unit of the SCS of the PDSCH where the RRC signaling is located.

For a network device, if the Scell satisfies a first condition, the network device starts to transmit the TRS at a second time. The definition of the second time is described below.

1) The second time is the time when the network device has transmitted the second RRC signaling; or
2) the second time is the time when the network device has transmitted a PDSCH corresponding to the second RRC signaling; or
3) the second time is the time when the network device has transmitted the second RRC signaling plus a time offset; or
4) the second time is the time when the network device has transmitted a PDSCH corresponding to the second RRC signaling plus a time offset; or
5) the second time is the time when the network device receives HARQ ACK information corresponding to the second RRC signaling; or
6) the second time is the time when the network device receives HARQ ACK information corresponding to the second RRC signaling plus a time offset.

In the above solution, the time offset is a fixed value or configured by a network device. Further, optionally, if the time offset is a fixed value, there is an association relationship between the value of the time offset and the capabilities of the terminal device.

The technical solutions of the embodiments of the present disclosure are exemplified below in combination with specific disclosure examples.

In an example, a base station has transmitted second RRC signaling (hereinafter simply referred to as RRC signaling), the RRC signaling configures at least one Scell, and the at least one Scell configures an initial RRC state to be an active state. If a certain Scell satisfies a first condition, the network device starts to transmit the TRS at a second time. Herein, the second time has the following definitions:

the time when the base station has transmitted RRC signaling, namely, the time when a physical layer of the base station has transmitted a PDSCH corresponding to the RRC signaling;

the time when the base station receives HARQ ACK information of RRC signaling after the RRC signaling is transmitted, namely, the time when the base station receives HARQ ACK information of a TB where the RRC signaling is located or the time when the base station receives HARQ ACK information of a PDSCH corresponding to the RRC signaling.

The second time may also be the above time plus a time offset, and the value of the offset may be a fixed value or a value configured by a network side. If it is a fixed value, the fixed value may be a fixed value having a relationship with the capability of the terminal device. For example, the fixed value corresponding to the first capability of UE processing capability and the fixed value corresponding to the second capability of UE processing capability are different. For example, fixed values (1, 2) or (2, 3) correspond to the first capability and the second capability, respectively. The measurement unit of the value of the offset may be ms or the number of slots. If it is the number of slots, the length of the slot is consistent with the length of slot in the unit of the SCS of the PDSCH where the RRC signaling is located.

Third Manner

The first activation instruction is a second MAC CE. The second MAC CE is a TRS activation/deactivation MAC CE.

For a terminal device, if the Scell satisfies a first condition, the terminal device starts to measure the TRS at a third time. The definition of the third time is described below.

1) The third time is the time when the terminal device receives the second MAC CE; or
2) the third time is the time when the terminal device receives a PDSCH corresponding to the second MAC CE; or
3) the third time is the time when the terminal device receives the second MAC CE plus a time offset; or
4) the third time is the time when the terminal device receives a PDSCH corresponding to the first MAC CE plus a time offset; or
5) the third time is the time when the terminal device has fed back HARQ ACK information corresponding to the second MAC CE; or
6) the third time is the time when the terminal device has fed back HARQ ACK information corresponding to the second MAC CE plus a time offset.

In the above solution, the time offset is a fixed value or configured by a network device. Further, optionally, if the time offset is a fixed value, there is an association relationship between the value of the time offset and the capability of the terminal device.

For a network device, if the Scell satisfies a first condition, the network device starts to transmit the TRS at a third time. The definition of the third time is described below.

1) The third time is the time when the network device has transmitted the second MAC CE; or
2) the third time is the time when the network device has transmitted a PDSCH corresponding to the second MAC CE; or
3) the third time is the time when the network device has transmitted the second MAC CE plus a time offset; or
4) the third time is the time when the network device has transmitted a PDSCH corresponding to the first MAC CE plus a time offset; or 5) the third time is the time when the network device receives HARQ ACK information corresponding to the second MAC CE; or 6) the third time is the time when the network device receives HARQ ACK information corresponding to the second MAC CE plus a time offset.

In the above solution, the time offset is a fixed value or configured by a network device. Further, optionally, if the time offset is a fixed value, there is an association relationship between the value of the time offset and the capabilities of the terminal device.

In the embodiments of the present disclosure, the second MAC CE is different from the first MAC CE, the second MAC CE may also be referred to as a MAC CE for TRS activation, and the first MAC CE may also be referred to as a MAC CE for Scell activation or an Scell activation/deactivation MAC CE.

The technical solutions of the embodiments of the present disclosure are exemplified below in combination with specific disclosure examples.

In an example, if a certain Scell satisfies a first condition, the terminal device starts to measure a TRS at a third time, and performs time-frequency synchronization with the Scell based on the measured TRS, so as to implement fast activation of the Scell. Herein, the third time has the following definitions:

the time when the terminal device receives second MAC CE (hereinafter referred to as MAC CE), namely, the time when the physical layer of the terminal device receives a PDSCH corresponding to the MAC CE;

the time when the terminal device has fed back HARQ ACK information of the MAC CE, namely, the time when the terminal device has fed back HARQ ACK information of a TB where the MAC CE is located or the time when the terminal device has fed back HARQ ACK information of a PDSCH corresponding to the MAC CE.

The third time may also be the above time plus a time offset, and the value of the offset may be a fixed value or a value configured by a network side. If it is a fixed value, the fixed value may be a fixed value having a relationship with the capability of the terminal device. For example, the fixed value corresponding to the first capability of UE processing capability and the fixed value corresponding to the second capability of UE processing capabilities are different. For example, fixed values (1, 2) or (2, 3) correspond to the first capability and the second capability, respectively. The measurement unit of the value of the offset may be ms or the number of slots. If it is the number of slots, the length of the slot is consistent with the length of slot in the unit of the SCS of the PDSCH where the MAC CE is located.

In an example, if a certain Scell satisfies a first condition, the base station starts to transmit the TRS at a third time. Herein, the third time has the following definitions:

the time when the base station has transmitted second MAC CE (hereinafter referred to as MAC CE), namely, the time when the physical layer of the base station has transmitted a PDSCH corresponding to the MAC CE;

the time when the base station receives HARQ ACK information of the MAC CE, namely, the time when the base station receives HARQ ACK information of a TB where the MAC CE is located or the time when the base station receives HARQ ACK information of a PDSCH corresponding to the MAC CE.

The third time may also be the above time plus a time offset, and the value of the offset may be a fixed value or a value configured by a network side. If it is a fixed value, the fixed value may be a fixed value having a relationship with the capability of the terminal device. For example, the fixed values corresponding to the first capability and the second capability2 of UE processing capabilities are different. For example, fixed values (1, 2) or (2, 3) correspond to the first capability and the second capability, respectively. The measurement unit of the value of the offset may be ms or the number of slots. If it is the number of slots, the length of the slot is consistent with the length of slot in the unit of the SCS of the PDSCH where the MAC CE is located.

In the embodiments of the present disclosure, the second MAC CE is transmitted simultaneously with the first MAC CE; or, the second MAC CE is transmitted independently from the first MAC CE. The first MAC CE is an Scell activation/deactivation MAC CE. In an optional manner, in the case where the second MAC CE is transmitted independently from the first MAC CE, the second MAC CE is transmitted when transmitting HARQ ACK information corresponding to the first MAC CE; or, the second MAC CE is transmitted before transmitting HARQ ACK information corresponding to the first MAC CE.

For example: MAC CE for TRS and MAC CE for Scell activation may be multiplexed in one TB for simultaneous transmission. Or, MAC CE for TRS is transmitted before or while MAC CE for Scell activation feeds back HARQ-ACK information.

The forms of the second MAC CE and the first MAC CE in the above solution are described below.

In the embodiments of the present disclosure, the second MAC CE includes N1 bits, N1 is a positive integer, the N1 bits correspond to N1 Scells one by one, the value of each bit is used for indicating whether to activate a TRS for the Scell corresponding to the bit, and the TRS is used for fast activation of the Scell.

In the embodiments of the present disclosure, the first MAC CE includes N2 bits, N2 is a positive integer greater than or equal to N1, the N2 bits correspond to N2 Serving cells one by one, and the value of each bit is used for indicating whether to activate the Serving cell corresponding to the bit.

In an optional manner, N1 is the number of Serving cells.

In an optional manner, the N1 Scells are Serving cells satisfying the first condition in the N2 Serving cells.

In an optional manner, the N1 bits are located behind the N2 bits.

In the above solution, optionally, the N1 bits in an ascending order of bits correspond to the N1 Scells in an ascending order of serving cell indexes one by one.

The technical solutions of the embodiments of the present disclosure are exemplified below in combination with specific disclosure examples.

In an example, referring to FIG. 5A, if the number of Scells that needs to be indicated or the maximum serving cell index is less than or equal to 7, MAC CE in the left format is used, otherwise MAC CE in the right format is used. Herein, the MAC CE refers to a second MAC CE. $C_i$ indicates whether to activate the TRS for the Scell with the serving cell index i. Optionally, the value of $C_i$ being 1 indicates activating the TRS for the corresponding Scell, the TRS is used for fast activation of the Scell, and the value of $C_i$ being 0 indicates not activating the TRS for the corresponding Scell. Further, when the value of $C_i$ is 0, the terminal device may use an SSB or conventional TRS as a synchronization signal when activating the Scell. The activated TRS of the Scell is a TRS configured on a BWP indicated by firstActiveDownlinkBWP-Id of the corresponding Scell.

In an example, referring to FIG. 5B, based on the Scell activation/deactivation MAC CE (i.e. the first MAC CE), TRS activation/deactivation indicator of the Scell satisfying the first condition in an ascending order of serving cell indexes corresponds to the bits following the Scell activation/deactivation MAC CE in an ascending order one by one. The value of a bit being 1 indicates activating the TRS for the corresponding Scell, and the TRS is used for fast activation of the Scell. The value of a bit being 0 indicates not activating the TRS for the corresponding Scell. Further, when the value of a bit is 0, the terminal device may use an SSB or conventional TRS as a synchronization signal when activating the corresponding Scell. The activated TRS of the Scell is a TRS configured on a BWP indicated by firstActiveDownlinkBWP-Id of the corresponding Scell.

In an example, referring to FIG. 5C, TRS activation/deactivation indicator of the Scell satisfying the first condition in an ascending order of serving cell indexes corresponds to the bits following the Scell activation/deactivation MAC CE in an ascending order one by one. The value of a bit being 1 indicates activating the TRS for the corresponding Scell, and the TRS is used for fast activation of the Scell. The value of a bit being 0 indicates not activating the TRS for the corresponding Scell. Further, when the value of a bit is 0, the terminal device may use an SSB or conventional TRS as a synchronization signal when activating the corresponding Scell. The activated TRS of the Scell is a TRS configured on a BWP indicated by firstActiveDownlinkBWP-Id of the corresponding Scell.

Fourth Manner

The first activation instruction is a third MAC CE. The third MAC CE indicates an activation/deactivation based on a CSI-RS resource set or a CSI-RS resource of a specified SCell.

A) In an optional manner, the third MAC CE includes a serving cell identifier. The third MAC CE is used for activating a TRS on a first active BWP of a specified Scell. The specified Scell is determined based on the serving cell identifier.

B) In an optional manner, the third MAC CE includes a serving cell identifier and a TRS resource set identifier. The third MAC CE is used for activating a specified TRS on a first active BWP of a specified Scell. The specified Scell is determined based on the serving cell identifier. The specified TRS is determined based on the TRS resource set identifier.

C) In an optional manner, the third MAC CE includes a serving cell identifier and a BWP identifier. The third MAC CE is used for activating a TRS on a specified BWP of a specified Scell. The specified Scell is determined based on the serving cell identifier. The specified BWP is determined based on the BWP identifier.

D) In an optional manner, the third MAC CE includes a serving cell identifier, a BWP identifier and a TRS resource set identifier. The third MAC CE is used for activating a specified TRS on a specified BWP of a specified Scell. The specified Scell is determined based on the serving cell identifier. The specified BWP is determined based on the BWP identifier. The specified TRS is determined based on the TRS resource set identifier.

For any one of the manners A) to D), optionally, the third MAC CE further includes a Transmission Configuration Indicator (TCI) state identifier.

The technical solutions of the embodiments of the present disclosure are exemplified below in combination with specific disclosure examples.

In an example, referring to FIG. 6A, a TRS on a specified BWP (determined by BWP ID) of a specified cell (determined by Serving Cell ID) is activated by using SP CSI-RS/CSI-IM Resource Set Activation/Deactivation MAC CE (i.e. third MAC CE). If it is the TRS that is to be activated, the terminal device ignores the information of the following TCI state field.

In an example, referring to FIG. 6B, a MAC CE shown in FIG. 6B (i.e. the third MAC CE) is adapted based on SP CSI-RS/CSI-IM Resource Set Activation/Deactivation MAC CE, and a specified TRS (determined by TRS resource set ID) on a specified BWP (determined by BWP ID) of a specified cell (determined by Serving Cell ID) is activated by using the MAC CE.

In an example, referring to FIG. 6C, a MAC CE shown in FIG. 6C (i.e. the third MAC CE) is adapted based on SP CSI-RS/CSI-IM Resource Set Activation/Deactivation MAC CE, and a TRS on a specified BWP (determined by BWP ID) of a specified cell (determined by Serving Cell ID) is activated by using the MAC CE.

In an example, referring to FIG. 6D, a MAC CE shown in FIG. 6D (i.e. the third MAC CE) is adapted based on SP CSI-RS/CSI-IM Resource Set Activation/Deactivation MAC CE, and a TRS on a BWP indicated by firstActiveDownlinkBWP-Id of a specified cell (determined by Serving Cell ID) is activated by using the MAC CE.

In an example, referring to FIG. 6E, a MAC CE shown in FIG. 6E (i.e. the third MAC CE) is adapted based on SP CSI-RS/CSI-IM Resource Set Activation/Deactivation MAC CE, and a specified TRS (determined by TRS resource set ID) on a BWP indicated by firstActiveDownlinkBWP-Id of a specified cell (determined by Serving Cell ID) is activated by using the MAC CE.

It is to be noted that all defined MAC CEs in the above solution need to define a corresponding LCID for identifying the MAC CE in a MAC PDU.

It is to be noted that if the time offset configured in the above solution is in the unit of slot, the slot length may be a slot length corresponding to an SCS pre-configured by a network or a slot length corresponding to a fixed SCS.

It is to be noted that the terminal device does not perform synchronization before the time offset.

Fifth Manner

The first activation instruction is first DCI. The first DCI is used for triggering the first active BWP of the Scell to be switched from a dormant BWP to a non-dormant BWP.

For a terminal device, if the Scell satisfies a second condition, the terminal device starts to measure the TRS at a fourth time. The definition of the fourth time is described below.

1) The fourth time is the time when the terminal device receives the first DCI; or
2) the fourth time is the time when the terminal device receives the first DCI plus a time offset; or
3) the fourth time is the time when the terminal device has fed back HARQ ACK corresponding to the first DCI; or
4) the fourth time is the time when the terminal device has fed back HARQ ACK corresponding to the first DCI plus a time offset.

For a network device, if the Scell satisfies a second condition, the network device starts to transmit the TRS at a fourth time. The definition of the fourth time is described below.

1) The fourth time is the time when the network device has transmitted the first DCI; or
2) the fourth time is the time when the network device has transmitted the first DCI plus a time offset; or 3) the fourth time is the time when the network device receives HARQ ACK corresponding to the first DCI; or
4) the fourth time is the time when the network device receives HARQ ACK corresponding to the first DCI plus a time offset.

In the above solution, the Scell satisfying a second condition includes at least one of the following:
the Scell is changed from a deactivated state to an active state;
the first active BWP of the Scell configures with a TRS and the TRS is used for Scell activation.

In the above solution, the time offset is a fixed value or configured by a network device. Further, optionally, if the time offset is a fixed value, there is an association relationship between the value of the time offset and the capability of the terminal device.

In an example, "firstActiveDownlinkBWP-Id of the Scell is not set as a dormant BWP" is as a condition (i.e. part of the first condition) for activating the TRS, that is, firstActiveDownlinkBWP-Id of the Scell is set as a dormant BWP, and the TRS will not be activated. When the terminal device receives DCI for triggering the transition from a dormant BWP to a non-dormant BWP or when the terminal device receives the DCI for triggering the transition from the dormant BWP to the non-dormant BWP plus a time offset, TRS activation is triggered, and the terminal device performs TRS measurement. Accordingly, TRS transmission is triggered after the base station has transmitted the DCI for triggering the transition from the dormant BWP to the non-dormant BWP or after the base station has transmitted the DCI for triggering the transition from the dormant BWP to the non-dormant BWP plus a time offset.

The value of the above-mentioned offset may be a fixed value or a value configured by a network side. If it is a fixed value, the fixed value may be a fixed value having a relationship with the capability of the terminal device. For example, the fixed values corresponding to the first capability and the second capability of UE processing capability are different. For example, fixed values (1, 2) or (2, 3) correspond to the first capability and the second capability, respectively. The measurement unit of the value of the offset may be ms or the number of slots. If it is the number of slots, the length of the slot is consistent with the length of slot in the unit of the SCS of the PDSCH where the DCI is located.

The technical solution of the embodiments of the present disclosure defines TRS configuration information and a measurement time and transmission time of a TRS, and a first activation instruction for activating the TRS, so that the TRS can be transmitted and received efficiently without wasting resources and power of the terminal device.

FIG. 7 illustrates a first schematic diagram of structural compositions of a device for triggering TRS activation provided by an embodiment of the present disclosure. The device is applied to a terminal device. As shown in FIG. 7, the device for triggering TRS activation includes a receiving unit 701 and a measurement unit 702.

The receiving unit 701 is configured to receive a first activation instruction transmitted by a network device. The first activation instruction is used for activating a TRS. The TRS is used for fast activation of the Scell.

The measurement unit 702 is configured to measure the TRS. The measured TRS is used for time-frequency synchronization with an Scell.

In an optional manner, the receiving unit 701 is further configured to receive first RRC signaling transmitted by the network device. The first RRC signaling includes TRS configuration information. The TRS configuration information includes first indication information. The first indication information is used for indicating a TRS type and/or a TRS purpose. The TRS type and/or the TRS purpose is used for determining that the TRS is used for fast activation of the Scell.

In an optional manner, the TRS configuration information further includes at least one of the following:
second indication information used for indicating the number of transmissions after the TRS is activated;
third indication information used for indicating a transmission interval of the TRS; or
fourth indication information used for indicating a time offset.

In an optional manner, the first RRC signaling includes a non-zero power CSI-RS resource set configuration and a CSI resource configuration.

The TRS configuration information is configured to be in the non-zero power CSI-RS resource set configuration or the CSI resource configuration.

In an optional manner, the first activation instruction is a first MAC CE. The first MAC CE is an Scell activation/deactivation MAC CE.

In an optional manner, the activation time of the TRS is the time when the terminal device starts to measure the TRS. The measurement unit 702 is configured to start, in response to that the Scell satisfies a first condition, to measure the TRS at a first time.

The first time is the time when the terminal device receives the first MAC CE; or,
the first time is the time when the terminal device receives a PDSCH corresponding to the first MAC CE; or,
the first time is the time when the terminal device receives the first MAC CE plus a time offset; or,
the first time is the time when the terminal device receives a PDSCH corresponding to the first MAC CE plus a time offset; or,
the first time is the time when the terminal device has fed back HARQ ACK information corresponding to the first MAC CE; or,
the first time is the time when the terminal device has fed back HARQ ACK information corresponding to the first MAC CE plus a time offset.

In an optional manner, the first activation instruction is second RRC signaling. The second RRC signaling is used for configuring at least one Scell. An initial state of the at least one Scell is an active state.

In an optional manner, the activation time of the TRS is the time when the terminal device starts to measure the TRS. The measurement unit 702 is configured to start, in response to that the Scell satisfies a first condition, to measure the TRS at a second time.

The second time is the time when the terminal device receives the second RRC signaling; or,
the second time is the time when the terminal device receives a PDSCH corresponding to the second RRC signaling; or,
the second time is the time when the terminal device receives the second RRC signaling plus a time offset; or,
the second time is the time when the terminal device receives a PDSCH corresponding to the second RRC signaling plus a time offset; or,
the second time is the time when the terminal device has received and decoded the second RRC signaling; or,
the second time is the time when the terminal device has received and decoded the second RRC signaling plus a time offset; or, the second time is the time when the terminal device completes activation of a first active BWP of the Scell after receiving the second RRC signaling; or, the second time is the time when the terminal device completes activation of a first active BWP of the Scell after receiving the second RRC signaling plus a time offset; or, the second time is the time when the terminal device has fed back HARQ ACK information corresponding to the second RRC signaling; or, the second time is the time when the terminal device has fed back HARQ ACK information corresponding to the second RRC signaling plus a time offset.

In an optional manner, the first activation instruction is a second MAC CE. The second MAC CE is a TRS activation/deactivation MAC CE.

In an optional manner, the activation time of the TRS is the time when the terminal device starts to measure the TRS.

The measurement unit 702 is configured to start, in response to that the Scell satisfies a first condition, to measure the TRS at a third time.

The third time is the time when the terminal device receives the second MAC CE; or,
 the third time is the time when the terminal device receives a PDSCH corresponding to the second MAC CE; or,
 the third time is the time when the terminal device receives the second MAC CE plus a time offset; or,
 the third time is the time when the terminal device receives a PDSCH corresponding to the first MAC CE plus a time offset; or,
 the third time is the time when the terminal device has fed back HARQ ACK information corresponding to the second MAC CE; or,
 the third time is the time when the terminal device has fed back HARQ ACK information corresponding to the second MAC CE plus a time offset.

In an optional manner, the second MAC CE is transmitted simultaneously with the first MAC CE; or,
 the second MAC CE is transmitted independently from the first MAC CE.

The first MAC CE is an Scell activation/deactivation MAC CE.

In an optional manner, in the case where the second MAC CE is transmitted independently from the first MAC CE,
 the second MAC CE is transmitted when transmitting the HARQ ACK information corresponding to the first MAC CE; or,
 the second MAC CE is transmitted before transmitting the HARQ ACK information corresponding to the first MAC CE.

In an optional manner, the second MAC CE includes N1 bits, N1 is a positive integer, the N1 bits correspond to N1 Scells one by one, the value of each bit is used for indicating whether to activate the TRS for the Scell corresponding to the bit, and the TRS is used for fast activation of the Scell.

In an optional manner, the first MAC CE includes N2 bits, N2 is a positive integer greater than or equal to N1, the N2 bits correspond to N2 Serving cells one by one, and the value of each bit is used for indicating whether to activate the Serving cell corresponding to the bit.

In an optional manner, the N1 Scells are Serving cells satisfying the first condition in the N2 Serving cells; or,
 N1 is the number of Serving cells.

In an optional manner, the N1 bits are located behind the N2 bits.

In an optional manner, the N1 bits in an ascending order of bits correspond to the N1 Scells in an ascending order of serving cell indexes one by one.

In an optional manner, the first activation instruction is a third MAC CE. The third MAC CE indicates an activation/deactivation based on a CSI-RS resource set or a CSI-RS resource of a specified SCell.

In an optional manner, the third MAC CE includes a serving cell identifier.

The third MAC CE is used for activating a TRS on a first active BWP of a specified Scell. The specified Scell is determined based on the serving cell identifier.

In an optional manner, the third MAC CE includes a serving cell identifier and a TRS resource set identifier.

The third MAC CE is used for activating a specified TRS on a first active BWP of a specified Scell. The specified Scell is determined based on the serving cell identifier. The specified TRS is determined based on the TRS resource set identifier.

In an optional manner, the third MAC CE includes a serving cell identifier and a BWP identifier.

The third MAC CE is used for activating a TRS on a specified BWP of a specified Scell. The specified Scell is determined based on the serving cell identifier. The specified BWP is determined based on the BWP identifier.

In an optional manner, the third MAC CE includes a serving cell identifier, a BWP identifier and a TRS resource set identifier.

The third MAC CE is used for activating a specified TRS on a specified BWP of a specified Scell. The specified Scell is determined based on the serving cell identifier. The specified BWP is determined based on the BWP identifier. The specified TRS is determined based on the TRS resource set identifier.

In an optional manner, the third MAC CE further includes a TCI state identifier.

In an optional manner, the Scell satisfies a first condition, including at least one of the following:
 the Scell being changed from a deactivated state to an activated state;
 the first active BWP of the Scell being not set as a dormant BWP; or
 the first active BWP of the Scell being configured with a TRS and the TRS being used for Scell activation.

In an optional manner, the first activation instruction is first DCI. The first DCI is used for triggering the first active BWP of the Scell to be switched from a dormant BWP to a non-dormant BWP.

In an optional manner, the activation time of the TRS is the time when the terminal device starts to measure the TRS.

The measurement unit 702 is configured to start, in response to that the Scell satisfies a second condition, to measure the TRS at a fourth time.

The fourth time is the time when the terminal device receives the first DCI; or,
 the fourth time is the time when the terminal device receives the first DCI plus a time offset; or,
 the fourth time is the time when the terminal device has fed back HARQ ACK corresponding to the first DCI; or,
 the fourth time is the time when the terminal device has fed back HARQ ACK corresponding to the first DCI plus a time offset.

In an optional manner, the Scell satisfying a second condition includes at least one of the following:
 the Scell being changed from a deactivated state to an activated state; or the first active BWP of the Scell being configured with a TRS and the TRS being used for Scell activation.

In an optional manner, the time offset is a fixed value or configured by a network device.

In an optional manner, if the time offset is a fixed value, there is an association relationship between the value of the time offset and the capability of the terminal device.

It is to be understood for those skilled in the art that the relevant description of the above-mentioned device for TRS activation of the embodiments of the present disclosure may be understood with reference to the relevant description of the method for TRS activation of the embodiments of the present disclosure.

Figure 8:
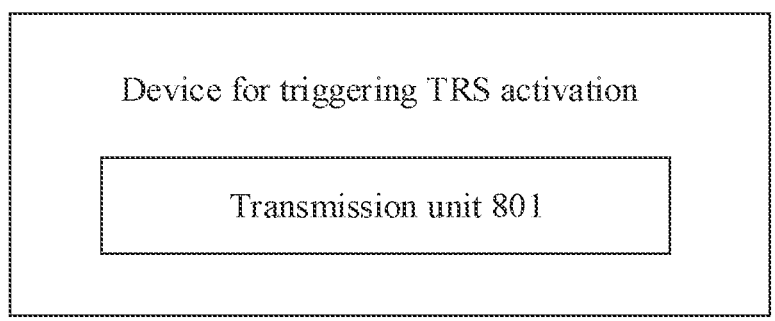
FIG. 8 illustrates a second schematic diagram of structural compositions of a device for triggering TRS activation provided by an embodiment of the present disclosure.

FIG. 8 illustrates a second schematic diagram of structural compositions of a device for triggering TRS activation provided by an embodiment of the present disclosure. The apparatus is applied to a network device. As shown in FIG. 8, the device for triggering TRS activation includes a transmission unit 801.

The transmission unit 801 is configured to transmit a first activation instruction to a terminal device. The first activation instruction is used for activating a TRS. The TRS is used for fast activation of an Scell. The transmission unit is also configured to transmit the TRS. The TRS is used for time-frequency synchronization between the terminal device and an Scell.

In an optional manner, the transmission unit 801 is further configured to transmit first RRC signaling to the terminal device. The first RRC signaling includes TRS configuration information. The TRS configuration information includes first indication information. The first indication information is used for indicating a TRS type and/or a TRS purpose. The TRS type and/or the TRS purpose is used for determining that the TRS is used for fast activation of the Scell.

In an optional manner, the TRS configuration information further includes at least one of the following:
second indication information used for indicating the number of transmissions after the TRS is activated;
third indication information used for indicating a transmission interval of the TRS; or
fourth indication information used for indicating a time offset.

In an optional manner, the first RRC signaling includes a non-zero power CSI-RS resource set configuration and a CSI resource configuration.

The TRS configuration information is configured to be in the non-zero power CSI-RS resource set configuration or the CSI resource configuration.

In an optional manner, the first activation instruction is a first MAC CE. The first MAC CE is an Scell activation/deactivation MAC CE.

In an optional manner, the activation time of the TRS is the time when the network device starts to transmit the TRS.

The transmission unit 801 is configured to start, in response to the Scell satisfies a first condition, to transmit the TRS at a first time.

The first time is the time when the network device has transmitted the first MAC CE; or,
the first time is the time when the network device has transmitted a PDSCH corresponding to the first MAC CE; or,
the first time is the time when the network device has transmitted the first MAC CE plus a time offset; or,
the first time is the time when the network device has transmitted a PDSCH corresponding to the first MAC CE plus a time offset; or, the first time is the time when the network device receives HARQ ACK information corresponding to the first MAC CE; or,
the first time is the time when the network device receives HARQ ACK information corresponding to the first MAC CE plus a time offset.

In an optional manner, the first activation instruction is second RRC signaling. The second RRC signaling is used for configuring at least one Scell. An initial state of the at least one Scell is an active state.

In an optional manner, the activation time of the TRS is the time when the network device starts to transmit the TRS.

The transmission unit 801 is configured to start, in response to that the Scell satisfies a first condition, to transmit the TRS at a second time.

The second time is the time when the network device has transmitted the second RRC signaling; or,
the second time is the time when the network device has transmitted a PDSCH corresponding to the second RRC signaling; or,
the second time is the time when the network device has transmitted the second RRC signaling plus a time offset; or,
the second time is the time when the network device has transmitted a PDSCH corresponding to the second RRC signaling plus a time offset; or,
the second time is the time when the network device receives HARQ ACK information corresponding to the second RRC signaling; or,
the second time is the time when the network device receives HARQ ACK information corresponding to the second RRC signaling plus a time offset.

In an optional manner, the first activation instruction is a second MAC CE. The second MAC CE is a TRS activation/deactivation MAC CE.

In an optional manner, the activation time of the TRS is the time when the network device starts to transmit the TRS.

The transmission unit 801 is configured to start, in response to that the Scell satisfies a first condition, to transmit the TRS at a third time.

The third time is the time when the network device has transmitted the second MAC CE; or,
the third time is the time when the network device has transmitted a PDSCH corresponding to the second MAC CE; or,
the third time is the time when the network device has transmitted the second MAC CE plus a time offset; or,
the third time is the time when the network device has transmitted a PDSCH corresponding to the first MAC CE plus a time offset; or,
the third time is the time when the network device receives HARQ ACK information corresponding to the second MAC CE; or,
the third time is the time when the network device receives HARQ ACK information corresponding to the second MAC CE plus a time offset.

In an optional manner, the second MAC CE is transmitted simultaneously with the first MAC CE; or,
the second MAC CE is transmitted independently from the first MAC CE.

The first MAC CE is an Scell activation/deactivation MAC CE.

In an optional manner, in the case where the second MAC CE is transmitted independently from the first MAC CE,
the second MAC CE is transmitted when transmitting HARQ ACK information corresponding to the first MAC CE; or, the second MAC CE is transmitted before transmitting HARQ ACK information corresponding to the first MAC CE.

In an optional manner, the second MAC CE includes N1 bits, N1 is a positive integer, the N1 bits correspond to N1 Scells one by one, the value of each bit is used for indicating whether to activate the TRS for the Scell corresponding to the bit, and the TRS is used for fast activation of the Scell.

In an optional manner, the first MAC CE includes N2 bits, N2 is a positive integer greater than or equal to N1, the N2 bits correspond to N2 Serving cells one by one, and the value of each bit is used for indicating whether to activate the Serving cell corresponding to the bit.

In an optional manner, the N1 Scells are Serving cells satisfying the first condition in the N2 Serving cells; or, N1 is the number of Serving cells.

In an optional manner, the N1 bits are located behind the N2 bits.

In an optional manner, the N1 bits in an ascending order of bits correspond to the N1 Scells in an ascending order of serving cell indexes one by one.

In an optional manner, the first activation instruction is a third MAC CE. The third MAC CE indicates an activation/deactivation based on a CSI-RS resource set or a CSI-RS resource of a specified SCell.

In an optional manner, the third MAC CE includes a serving cell identifier.

The third MAC CE is used for activating a TRS on a first active BWP of a specified Scell. The specified Scell is determined based on the serving cell identifier.

In an optional manner, the third MAC CE includes a serving cell identifier and a TRS resource set identifier.

The third MAC CE is used for activating a specified TRS on a first active BWP of a specified Scell. The specified Scell is determined based on the serving cell identifier. The specified TRS is determined based on the TRS resource set identifier.

In an optional manner, the third MAC CE includes a serving cell identifier and a BWP identifier.

The third MAC CE is used for activating a TRS on a specified BWP of a specified Scell. The specified Scell is determined based on the serving cell identifier. The specified BWP is determined based on the BWP identifier.

In an optional manner, the third MAC CE includes a serving cell identifier, a BWP identifier and a TRS resource set identifier.

The third MAC CE is used for activating a specified TRS on a specified BWP of a specified Scell. The specified Scell is determined based on the serving cell identifier. The specified BWP is determined based on the BWP identifier. The specified TRS is determined based on the TRS resource set identifier.

In an optional manner, the third MAC CE further includes a TCI state identifier.

In an optional manner, the Scell satisfies a first condition, including at least one of the following:
the Scell being changed from a deactivated state to an activated state;
the first active BWP of the Scell being not set as a dormant BWP; or
the first active BWP of the Scell being configured with a TRS and the TRS is used for Scell activation.

In an optional manner, the first activation instruction is a first DCI. The first DCI is used for triggering the first active BWP of the Scell to be switched from a dormant BWP to a non-dormant BWP.

In an optional manner, the activation time of the TRS is the time when the network device starts to transmit the TRS.

The transmission unit 801 is configured to start, in response to that the Scell satisfies a second condition, to transmit the TRS at a fourth time.

The fourth time is the time when the network device has transmitted the first DCI; or,
the fourth time is the time when the network device has transmitted the first DCI plus a time offset; or,
the fourth time is the time when the network device receives HARQ ACK corresponding to the first DCI; or,
the fourth time is the time when the network device receives HARQ ACK corresponding to the first DCI plus a time offset.

In an optional manner, the Scell satisfying a second condition includes at least one of the following:
the Scell being changed from a deactivated state to an activated state; or
the first active BWP of the Scell being configured with a TRS and the TRS being used for Scell activation.

In an optional manner, the time offset is a fixed value or configured by a network device.

In an optional manner, in response to that the time offset is a fixed value, there is an association relationship between the value of the time offset and the capability of the terminal device.

It is to be understood for those skilled in the art that the relevant description of the above-mentioned device for TRS activation of the embodiments of the present disclosure may be understood with reference to the relevant description of the method for TRS activation of the embodiments of the present disclosure.

Figure 9:
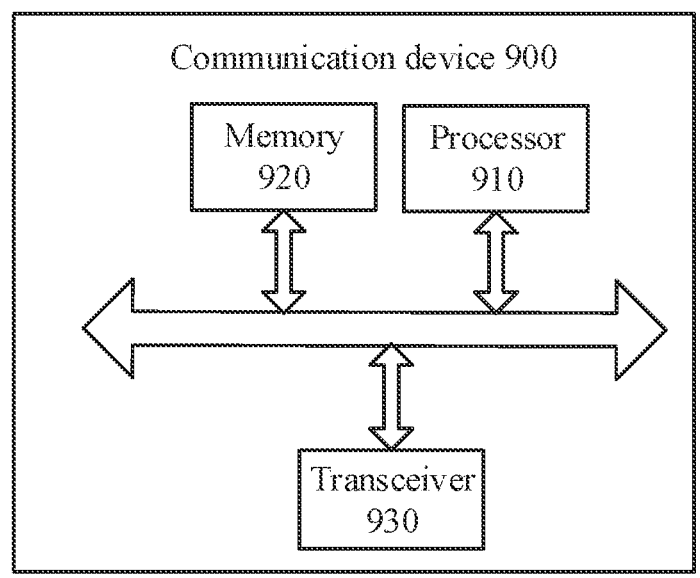
FIG. 9 illustrates a schematic structural diagram of a communication device provided by an embodiment of the present disclosure.

FIG. 9 illustrates a schematic structural diagram of a communication device 900 provided by an embodiment of the present disclosure. The communication device may be a terminal device, or may be a network device. The communication device 500 as shown in FIG. 9 includes a processor 510. The processor 910 may call and execute a computer program from a memory to implement the method in the embodiments of the present disclosure.

Optionally, as shown in FIG. 9, the communication| device 900 may further include a memory 920. The processor 910 may call and execute the computer program from the memory 920 to implement the method in the embodiments of the present disclosure.

The memory 920 may be independent from the processor 910, or may be integrated into the processor 910.

Optionally, as shown in FIG. 9, the communication device 900 may further include a transceiver 930. The processor 910 may control the transceiver 930 to be in communication with other devices, specifically, to transmit information or data to other devices, or receive the information or data transmitted by other devices.

The transceiver 930 may include a transmitter and a receiver. The transceiver 930 may further include an antenna. There may be one or more antennas.

Optionally, the communication device 900 may specifically be a network device of the embodiment of the present disclosure, and the communication device 900 may implement corresponding flows implemented by the network device in various methods of the embodiments of the present disclosure, which will not be elaborated here for simplicity.

Optionally, the communication device 900 may specifically be a mobile terminal device/terminal device of the embodiment of the present disclosure, and the communication device 900 may implement corresponding flows implemented by the mobile terminal device/terminal device in various methods of the embodiments of the present disclosure, which will not be elaborated here for simplicity.

Figure 10:
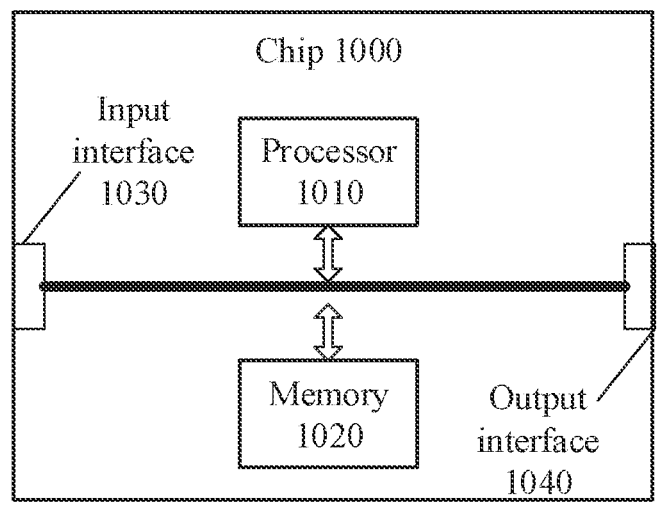
FIG. 10 illustrates a schematic structural diagram of a chip according to an embodiment of the present disclosure.

FIG. 10 illustrates a schematic structural diagram of a chip according to an embodiment of the present disclosure. The chip 1000 as shown in FIG. 10 includes a processor 1010. The processor 1010 may call and execute a computer program from a memory to implement the method in the embodiments of the present disclosure.

Optionally, as shown in FIG. 10, the chip 1000 may further include a memory 1020. The processor 1010 may call and execute the computer program from the memory 1020 to implement the method in the embodiments of the present disclosure.

The memory 1020 may be independent of the processor 1010, or may be integrated into the processor 1010.

Optionally, the chip 1000 may further include an input interface 1030. The processor 1010 may control the input interface 1030 to be in communication with other devices or chips, specifically, to acquire the information or data transmitted by other devices or chips.

Optionally, the chip 1000 may further include an output interface 1040. The processor 1010 may control the output interface 1040 to be in communication with other devices or chips, specifically, to output information or data to other devices or chips.

Optionally, the chip may be applied to a network device in the embodiments of the present disclosure, and the chip may implement corresponding flows implemented by the network device in various methods of the embodiments of the present disclosure, which will not be elaborated here for simplicity.

Optionally, the communication device may specifically be a mobile terminal device/terminal device of the embodiment of the present disclosure, and the chip may implement corresponding flows implemented by the mobile terminal device/terminal device in various methods of the embodiments of the present disclosure, which will not be elaborated here for simplicity.

It is to be understood that the chip mentioned in the embodiment of the present disclosure may also be called a system-level chip, a system chip, a chip system, or a system on chip, etc.

Figure 11:
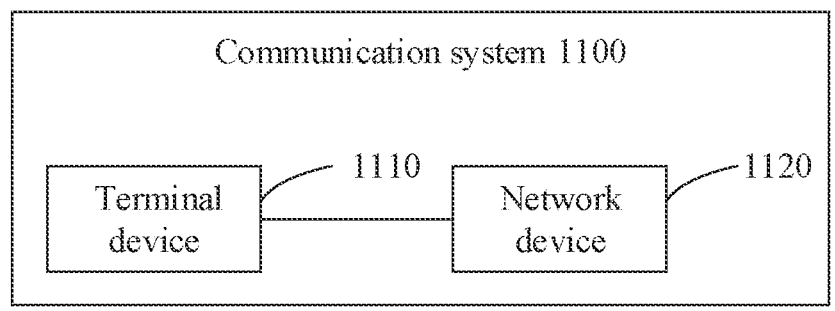
FIG. 11 illustrates a schematic block diagram of a communication system provided by an embodiment of the present disclosure.

FIG. 11 illustrates a schematic block diagram of a communication system 1100 provided by an embodiment of the present disclosure. As shown in FIG. 11, the communication system 1100 includes a terminal device 1110 and a network device 1120.

The terminal device 1110 may be configured to implement corresponding functions implemented by the terminal device in the above-mentioned method, and the network device 1120 may be configured to implement corresponding functions implemented by the network device in the above-mentioned method, which will not be elaborated here for simplicity.

It is to be understood that the processor of the embodiments of the present disclosure may be an integrated circuit chip with signal processing capacity. In an implementation process, various steps of the above-mentioned method embodiments may be completed by an integrated logic circuit of hardware in the processor or an instruction in the form of software. The above-mentioned processor may be a general-purpose processor, a Digital Signal Processor (DSP), an Disclosure Specific Integrated Circuit (ASIC), a Field Programmable Gate Array (FPGA), or other programmable logic devices, discrete gate or transistor logic devices, and discrete hardware components. Various methods, steps, and logical block diagrams of the disclosure in the embodiments of the present disclosure may be implemented or performed. The general-purpose processor may be a microprocessor, any conventional processor, or the like. Steps of the methods disclosed with reference to the embodiments of the present disclosure may be directly performed and accomplished by a hardware decoding processor, or may be performed and accomplished by a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the present disclosure may be a volatile memory or a nonvolatile memory, or may include a volatile memory and a nonvolatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of the systems and methods described herein includes but is not limited to these and any other proper types of memories.

It is to be understood that the above-mentioned memories are exemplary but not restrictive, for example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the present disclosure are intended to include, but not limited to, these and any other suitable types of memories.

The embodiments of the present disclosure further provide a computer readable storage medium, which is configured to store a computer program.

Optionally, the computer readable storage medium may be applied to a network device in the embodiments of the present disclosure. The computer program enables a computer to execute corresponding flows implemented by the network device in each method of the embodiments of the present disclosure, which will not be elaborated here for simplicity.

Optionally, the computer readable storage medium may be applied to a mobile terminal device/terminal device in the embodiments of the present disclosure. The computer program enables a computer to execute corresponding flows implemented by the mobile terminal device/terminal device in each method of the embodiments of the present disclosure, which will not be elaborated here for simplicity.

The embodiments of the present disclosure further provide a computer program product, which includes a computer program instruction.

Optionally, the computer program product may be applied to a network device in the embodiments of the present disclosure. The computer program instruction enables a computer to execute corresponding flows implemented by the network device in each method of the embodiments of the present disclosure, which will not be elaborated here for simplicity.

Optionally, the computer program product may be applied to a mobile terminal device/terminal device in the embodiments of the present disclosure. The computer program instruction enables a computer to execute corresponding flows implemented by the mobile terminal device/terminal device in each method of the embodiments of the present disclosure, which will not be elaborated here for simplicity.

The embodiments of the present disclosure further provide a computer program.

Optionally, the computer program may be applied to a network device in the embodiments of the present disclosure. When executed on a computer, the computer program enables the computer to execute corresponding flows implemented by the network device in each method of the embodiments of the present disclosure, which will not be elaborated here for simplicity.

Optionally, the computer program may be applied to a mobile terminal device/terminal device in the embodiments of the present disclosure. When executed on a computer, the computer program enables the computer to execute corresponding flows implemented by the mobile terminal device/terminal device in each method of the embodiments of the present disclosure, which will not be elaborated here for simplicity.

Those of ordinary skill in the art may be aware that the units and algorithm steps in the examples described with reference to the embodiments disclosed herein can be implemented by electronic hardware or a combination of computer software and electronic hardware. Whether the functions are performed by hardware or software depends on particular applications and design constraints of the technical solutions. Those skilled in the art may implement the described functions in different ways for each specific application, but such implementation should not be considered beyond the scope of the present disclosure.

It is to be clearly understood for those skilled in the art that, for the purpose of convenient and brief description, for a detailed working process of the foregoing system, device, and unit, reference may be made to a corresponding process in the foregoing method embodiments, and details are not described again herein.

In the several embodiments provided in the present disclosure, it is to be understood that the disclosed system, device, and method may be implemented in other manners. For example, the described device embodiment is merely schematic. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one location, or may be distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, they may be stored in a computer readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The above-mentioned storage medium includes: various media capable of storing program codes such as a U disk, a mobile hard disk, a ROM, a RAM, a magnetic disk, or an optical disk.

The above descriptions are merely specific implementations of the present disclosure, but are not intended to limit the scope of protection of the present disclosure. Any variation or replacement readily figured out by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A terminal device, comprising a processor and a memory, wherein the memory is configured to store a computer program, and the processor is configured to call and execute the computer program stored in the memory, to cause the terminal device to perform operations comprising:
   receiving a first activation instruction transmitted by a network device, the first activation instruction being used for activating a TRS, and the TRS being used for fast activation of a Secondary Cell (Scell); and
   measuring the TRS, the measured TRS being used for time-frequency synchronization with the Scell;
   wherein before receiving the first activation instruction transmitted by the network device, the operations further comprise:
   receiving a first Radio Resource Control (RRC) signaling transmitted by the network device, the first RRC signaling comprising TRS configuration information, the TRS configuration information comprising first indication information, the first indication information being used for indicating at least one of a TRS type or a TRS purpose, and the at least one of the TRS type or the TRS purpose being used for determining that the TRS is used for the fast activation of the Scell; and
   wherein the TRS configuration information further comprises second indication information used for indicating a number of transmissions after the TRS is activated.

2. The terminal device of claim 1, wherein the TRS configuration information further comprises at least one of:
   third indication information used for indicating a transmission interval of the TRS; or
   fourth indication information used for indicating a time offset.

3. The terminal device of claim 1, wherein the first RRC signaling comprises a non-zero power Channel State Information-Reference Signal (CSI-RS) resource set configuration and a CSI resource configuration; and the TRS configuration information is configured to be in the non-zero power CSI-RS resource set configuration or the CSI resource configuration.

4. The terminal device of claim 1, wherein the first activation instruction is a second Media Access Control Control Element (MAC CE), and the second MAC CE is a TRS activation/deactivation MAC CE.

5. The terminal device method of claim 4, wherein the second MAC CE comprises N1 bits, N1 is a positive integer, the N1 bits correspond to N1 Scells one by one, a value of each bit is used for indicating whether to activate a TRS for an Scell corresponding to the bit, and the TRS is used for fast activation of the Scell.

6. The terminal device of claim 5, wherein a first MAC CE comprises N2 bits, N2 is a positive integer greater than or equal to N1, the N2 bits correspond to N2 Serving cells one by one, and a value of each bit is used for indicating whether to activate a Serving cell corresponding to the bit, the first MAC CE is an Scell activation/deactivation MAC CE.

7. The terminal device of claim 5, wherein the N1 bits in an ascending order of bits correspond to the N1 Scells in an ascending order of serving cell indexes one by one.

8. The terminal device of claim 6, wherein the N1 Scells are Serving cells satisfying a first condition in the N2 Serving cells; or N1 is a number of Serving cells.

9. The terminal device of claim 6, wherein the N1 bits are located behind the N2 bits.

10. The terminal device of claim 8, wherein a Scell of the N1 Scells satisfying the first condition comprises at least one of:

the Scell being changed from a deactivated state to an active state;
the first active BWP of the Scell being not set as a dormant BWP; or
the first active BWP of the Scell being configured with a TRS and the TRS being used for Scell activation.

11. The terminal device of claim 1, wherein the first activation instruction comprises a first Media Access Control Control Element (MAC CE) and a second MAC CE, the first MAC CE is an Scell activation/deactivation MAC CE and the second MAC CE is a TRS activation/deactivation MAC CE;

the second MAC CE comprises N1 bits, N1 is a positive integer, the N1 bits correspond to N1 Scells one by one, a value of each of the N1 bits is used for indicating whether to activate a TRS for an Scell corresponding to the respective bit, and the TRS is used for fast activation of the Scell;
the first MAC CE comprises N2 bits, N2 is a positive integer greater than or equal to N1, the N2 bits correspond to N2 Serving cells one by one, and a value of each of the N2 bits is used for indicating whether to activate a Serving cell corresponding to the respective bit;
the N1 Scells are Serving cells satisfying a first condition in the N2 Serving cells;
the N1 bits are located behind the N2 bits;
the N1 bits in an ascending order of bits correspond to the N1 Scells in an ascending order of serving cell indexes one by one;
the N1 Scells satisfying the first condition comprises: the N1 Scells being changed from a deactivated state to an active state; and
a TRS of an activated Scell is a TRS on a BWP indicated by an identifier of a first active BWP of the activated Scell.

12. A network device, comprising a processor and a memory, wherein the memory is configured to store a computer program, and the processor is configured to call and execute the computer program stored in the memory, to cause the terminal device to perform operations comprising:

transmitting a first activation instruction to a terminal device, the first activation instruction being used for activating a TRS, and the TRS being used for fast activation of a Secondary Cell (Scell); and
transmitting the TRS, the TRS being used for time-frequency synchronization between the terminal device and the Scell;
wherein before transmitting a first activation instruction to a terminal device, the operations further comprise:
transmitting a first Radio Resource Control (RRC) signaling to the terminal device, the first RRC signaling comprising TRS configuration information, the TRS configuration information comprising first indication information, the first indication information being used for indicating at least one of a TRS type or a TRS purpose, and the at least one of TRS type or the TRS purpose being used for determining that the TRS is used for fast activation of the Scell;
wherein the TRS configuration information further comprises second indication information used for indicating a number of transmissions after the TRS is activated.

13. The network device of claim 12, wherein the TRS configuration information further comprises at least one of:

third indication information used for indicating a transmission interval of the TRS; or
fourth indication information used for indicating a time offset.

14. The network device of claim 12, wherein the first RRC signaling comprises a non-zero power Channel State Information-Reference Signal (CSI-RS) resource set configuration and a CSI resource configuration; and the TRS configuration information is configured to be in the non-zero power CSI-RS resource set configuration or the CSI resource configuration.

15. The network device of claim 12, wherein the first activation instruction is a second Media Access Control Control Element (MAC CE), and the second MAC CE is a TRS activation/deactivation MAC CE.

16. The network device of claim 15, wherein the second MAC CE comprises N1 bits, N1 is a positive integer, the N1 bits correspond to N1 Scells one by one, a value of each bit is used for indicating whether to activate a TRS for an Scell corresponding to the bit, and the TRS is used for the fast activation of the Scell.

17. The network device of claim 16, wherein a first MAC CE comprises N2 bits, N2 is a positive integer greater than or equal to N1, the N2 bits correspond to N2 Serving cells one by one, and a value of each bit is used for indicating whether activate a Serving cell corresponding to the bit, the first MAC CE is an Scell activation/deactivation MAC CE.

18. The network device of claim 17, wherein the N1 Scells are Serving cells satisfying a first condition in the N2 Serving cells; or N1 is a number of Serving cells.

19. The network device of claim 12, wherein the first activation instruction comprises a first Media Access Control Control Element (MAC CE) and a second MAC CE, the first MAC CE is an Scell activation/deactivation MAC CE and the second MAC CE is a TRS activation/deactivation MAC CE;

the second MAC CE comprises N1 bits, N1 is a positive integer, the N1 bits correspond to N1 Scells one by one, a value of each of the N1 bits is used for indicating whether to activate a TRS for an Scell corresponding to the respective bit, and the TRS is used for fast activation of the Scell;

the first MAC CE comprises N2 bits, N2 is a positive integer greater than or equal to N1, the N2 bits correspond to N2 Serving cells one by one, and a value of each of the N2 bits is used for indicating whether to activate a Serving cell corresponding to the respective bit;

the N1 Scells are Serving cells satisfying a first condition in the N2 Serving cells;

the N1 bits are located behind the N2 bits;

the N1 bits in an ascending order of bits correspond to the N1 Scells in an ascending order of serving cell indexes one by one;

the N1 Scells satisfying the first condition comprises: the N1 Scells being changed from a deactivated state to an active state; and a TRS of an activated Scell is a TRS on a BWP indicated by an identifier of a first active BWP of the activated Scell.

20. A method for triggering Tracking Reference Signal (TRS) activation, comprising:

receiving, by a terminal device, a first activation instruction transmitted by a network device, the first activation instruction being used for activating a TRS, and the TRS being used for fast activation of a Secondary Cell (Scell); and measuring, by the terminal device, the TRS, the measured TRS being used for time-frequency synchronization with the Scell;

wherein before receiving, by the terminal device, the first activation instruction transmitted by the network device, the method further comprises:

receiving, by the terminal device, a first Radio Resource Control (RRC) signaling transmitted by the network device, the first RRC signaling comprising TRS configuration information, the TRS configuration information comprising first indication information, the first indication information being used for indicating at least one of a TRS type or a TRS purpose, and the at least one of the TRS type or the TRS purpose being used for determining that the TRS is used for the fast activation of the Scell; and wherein the TRS configuration information further comprises second indication information used for indicating a number of transmissions after the TRS is activated.

* * * * *